United States Patent
Moshfeghi

(10) Patent No.: US 10,917,206 B2
(45) Date of Patent: *Feb. 9, 2021

(54) METHOD AND SYSTEM FOR PROVIDING DIVERSITY IN A NETWORK THAT UTILIZES DISTRIBUTED TRANSCEIVERS WITH ARRAY PROCESSING

(71) Applicant: Golba LLC

(72) Inventor: Mehran Moshfeghi, Rancho Palos Verdes, CA (US)

(73) Assignee: GOLBA LLC, Rancho Palos Verdes, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/129,413

(22) Filed: Sep. 12, 2018

(65) Prior Publication Data
US 2019/0097770 A1    Mar. 28, 2019

Related U.S. Application Data

(63) Continuation of application No. 15/706,759, filed on Sep. 17, 2017, now abandoned, which is a (Continued)

(51) Int. Cl.
*H04L 5/00* (2006.01)
*H04B 7/0408* (2017.01)
(Continued)

(52) U.S. Cl.
CPC .............. *H04L 5/0032* (2013.01); *H04B 1/40* (2013.01); *H04B 7/024* (2013.01); *H04B 7/043* (2013.01);
(Continued)

(58) Field of Classification Search
CPC ...... H04L 27/12; H04L 5/0032; H04W 24/08; H04W 4/80; H04W 72/0453;
(Continued)

(56) References Cited

U.S. PATENT DOCUMENTS

| 3,618,097 A | 11/1971 | Mcleod, Jr. |
| 3,835,469 A | 9/1974 | Chen et al. |

(Continued)

FOREIGN PATENT DOCUMENTS

| EP | 1890441 A2 | 2/2008 |
| EP | 1890441 A3 | 3/2013 |

(Continued)

OTHER PUBLICATIONS

Patent Board Decision—Examiner Affirmed for U.S. Appl. No. 13/473,144 dated Jun. 4, 2018.
(Continued)

*Primary Examiner* — Ajibola A Akinyemi
(74) *Attorney, Agent, or Firm* — Chip Law Group

(57) ABSTRACT

A communication device that comprises a plurality of distributed transceivers, a central processor and a network management engine may be configured based on one or more diversity modes of operations. The diversity modes of operations may comprise a spatial diversity mode, a frequency diversity mode, and/or a polarization diversity mode. Diversity mode configuration may comprise forming, based on selected diversity mode, a plurality of communication modules from the plurality of distributed transceivers, wherein each of the plurality of communication modules may comprise one or more antennas and/or antenna array elements, and one or more of said plurality of distributed transceivers associated with said one or more antennas and/or antenna array elements. The plurality of communication modules may be utilized to concurrently communicate multiple data streams. The multiple data streams may comprise the same data.

21 Claims, 7 Drawing Sheets

Related U.S. Application Data continuation of application No. 13/473,160, filed on May 16, 2012, now Pat. No. 9,780,928.

(60) Provisional application No. 61/548,201, filed on Oct. 17, 2011.

(51) Int. Cl.

| | | |
|---|---|---|
| *H04B 7/0426* | (2017.01) | |
| *H04B 1/40* | (2015.01) | |
| *H04L 27/12* | (2006.01) | |
| *H04W 4/80* | (2018.01) | |
| *H04W 88/06* | (2009.01) | |
| *H04B 7/06* | (2006.01) | |
| *H04W 88/02* | (2009.01) | |
| *H04W 72/08* | (2009.01) | |
| *H04B 7/0413* | (2017.01) | |
| *H04B 7/08* | (2006.01) | |
| *H04W 24/08* | (2009.01) | |
| *H04W 72/04* | (2009.01) | |
| *H04B 7/024* | (2017.01) | |
| *H04W 84/12* | (2009.01) | |

(52) U.S. Cl.
CPC .......... *H04B 7/0408* (2013.01); *H04B 7/0413* (2013.01); *H04B 7/0689* (2013.01); *H04B 7/0897* (2013.01); *H04L 27/12* (2013.01); *H04W 4/80* (2018.02); *H04W 24/08* (2013.01); *H04W 72/046* (2013.01); *H04W 72/0453* (2013.01); *H04W 72/0473* (2013.01); *H04W 72/085* (2013.01); *H04W 88/02* (2013.01); *H04W 88/06* (2013.01); *H04W 84/12* (2013.01); *Y02D 30/70* (2020.08)

(58) Field of Classification Search
CPC ........... H04W 72/046; H04W 72/0473; H04W 72/085; H04W 84/12; H04W 88/02; H04W 88/06
USPC ....................................................... 455/509
See application file for complete search history.

(56) References Cited

U.S. PATENT DOCUMENTS

| | | |
|---|---|---|
| 5,473,602 A | 12/1995 | McKenna et al. |
| 5,479,651 A | 12/1995 | Nakaguchi |
| 5,525,990 A | 6/1996 | Lewis |
| 5,561,850 A | 10/1996 | Makitalo et al. |
| 5,598,173 A | 1/1997 | Forti et al. |
| 5,666,124 A | 9/1997 | Chethik et al. |
| 5,771,017 A | 6/1998 | Dean et al. |
| 5,883,602 A | 3/1999 | Volman |
| 5,905,473 A | 5/1999 | Taenzer |
| 5,936,577 A | 8/1999 | Shoki et al. |
| 5,940,033 A | 8/1999 | Locher et al. |
| 6,018,316 A | 1/2000 | Rudish et al. |
| 6,307,502 B1 | 10/2001 | Marti-Canales et al. |
| 6,405,018 B1 | 6/2002 | Reudink et al. |
| 6,433,920 B1 | 8/2002 | Welch et al. |
| 6,456,252 B1 | 9/2002 | Goyette |
| 6,487,417 B1 | 11/2002 | Rossoni et al. |
| 6,577,631 B1 | 6/2003 | Keenan et al. |
| 6,600,776 B1 | 7/2003 | Alamouti et al. |
| 6,718,159 B1 | 4/2004 | Sato |
| 6,802,035 B2 | 10/2004 | Catreux et al. |
| 6,804,491 B1 | 10/2004 | Uesugi |
| 6,992,622 B1 | 1/2006 | Chiang et al. |
| 7,020,482 B2 | 3/2006 | Medvedev et al. |
| 7,058,367 B1 | 6/2006 | Luo et al. |
| 7,187,949 B2 | 3/2007 | Chang et al. |
| 7,206,294 B2 | 4/2007 | Garahi et al. |
| 7,248,217 B2 | 7/2007 | Mani et al. |
| 7,248,841 B2 | 7/2007 | Agee et al. |
| 7,260,141 B2 | 8/2007 | Bierly et al. |
| 7,333,455 B1 | 2/2008 | Bolt et al. |
| 7,339,979 B1 | 3/2008 | Kelkar |
| 7,363,058 B2 | 4/2008 | Gustaf |
| 7,424,225 B1 | 9/2008 | Elliott |
| 7,574,236 B1 | 8/2009 | Mansour |
| 7,636,573 B2 | 12/2009 | Walton et al. |
| 7,688,909 B2 | 3/2010 | Tsutsui |
| 7,689,216 B2 | 3/2010 | Wandel |
| 7,710,319 B2 | 5/2010 | Nassiri-Toussi et al. |
| 7,890,114 B2 | 2/2011 | Braun et al. |
| 7,904,117 B2 | 3/2011 | Doan et al. |
| 7,911,985 B2 | 3/2011 | Proctor, Jr. et al. |
| 7,920,889 B2 | 4/2011 | Hoshino et al. |
| 7,986,742 B2 | 7/2011 | Ketchum et al. |
| 8,014,366 B2 | 9/2011 | Wax et al. |
| 8,098,752 B2 | 1/2012 | Hwang et al. |
| 8,121,235 B1 | 2/2012 | Sun et al. |
| 8,126,408 B2 | 2/2012 | Ahrony et al. |
| 8,140,122 B2 | 3/2012 | Park et al. |
| 8,160,601 B2 | 4/2012 | Veselinovic et al. |
| 8,175,184 B2 | 5/2012 | Kim et al. |
| 8,190,102 B2 | 5/2012 | Rofougaran |
| 8,203,978 B2 | 6/2012 | Rodney et al. |
| 8,228,188 B2 | 7/2012 | Key et al. |
| 8,279,132 B2 | 10/2012 | Jung et al. |
| 8,280,445 B2 | 10/2012 | Yong et al. |
| 8,314,736 B2 | 11/2012 | Moshfeghi |
| 8,320,304 B2 | 11/2012 | Deb et al. |
| 8,364,188 B2 | 1/2013 | Deb et al. |
| 8,369,791 B2 | 2/2013 | Hafeez |
| 8,385,305 B1 | 2/2013 | Negus et al. |
| 8,385,452 B2 | 2/2013 | Gorokhov |
| 8,396,157 B2 | 3/2013 | Li et al. |
| 8,457,798 B2 | 6/2013 | Hackett |
| 8,462,047 B1 | 6/2013 | Ai et al. |
| 8,482,462 B2 | 7/2013 | Komijani et al. |
| 8,570,988 B2 | 10/2013 | Wallace et al. |
| 8,588,193 B1 | 11/2013 | Ho et al. |
| 8,620,301 B1 | 12/2013 | Hessel |
| 8,644,262 B1 | 2/2014 | Sun et al. |
| 8,654,815 B1 | 2/2014 | Forenza et al. |
| 8,744,513 B2 | 6/2014 | Chen et al. |
| 8,750,264 B2 | 6/2014 | Shatti |
| 8,780,943 B2 | 7/2014 | Moshfeghi |
| 8,787,469 B2 | 7/2014 | Kim et al. |
| 8,817,678 B2 | 8/2014 | Moshfeghi |
| 8,854,255 B1 | 10/2014 | Ehret |
| 8,885,628 B2 | 11/2014 | Palanki et al. |
| 9,037,094 B2 | 5/2015 | Moshfeghi |
| 9,065,515 B2 | 6/2015 | Pezennec et al. |
| 9,112,648 B2 | 8/2015 | Moshfeghi |
| 9,185,601 B2 | 11/2015 | Frerking et al. |
| 9,197,982 B2 | 11/2015 | Moshfeghi |
| 9,225,482 B2 | 12/2015 | Moshfeghi |
| 9,226,092 B2 | 12/2015 | Moshfeghi |
| 9,252,908 B1 | 2/2016 | Branlund |
| 9,253,587 B2 | 2/2016 | Moshfeghi |
| 9,438,389 B2 | 9/2016 | Moshfeghi et al. |
| 9,456,354 B2 | 9/2016 | Branlund |
| 9,548,805 B2 | 1/2017 | Moshfeghi et al. |
| 9,602,257 B2 | 3/2017 | Moshfeghi et al. |
| 9,660,777 B2 | 5/2017 | Moshfeghi et al. |
| 9,680,554 B2 | 6/2017 | Moshfeghi et al. |
| 9,686,060 B2 | 6/2017 | Moshfeghi |
| 9,698,948 B2 | 7/2017 | Moshfeghi |
| 9,736,637 B2 | 8/2017 | Larsen et al. |
| 9,780,928 B2 | 10/2017 | Moshfeghi et al. |
| 9,787,103 B1 | 10/2017 | Leabman et al. |
| 9,829,563 B2 | 11/2017 | Xiao et al. |
| 9,923,620 B2 | 3/2018 | Moshfeghi et al. |
| 10,020,861 B2 | 7/2018 | Moshfeghi et al. |
| 10,069,555 B2 | 9/2018 | Islam et al. |
| 10,069,608 B2 | 9/2018 | Moshfeghi et al. |
| 10,084,576 B2 | 9/2018 | Moshfeghi et al. |
| 10,090,887 B1 | 10/2018 | Rofougaran et al. |
| 10,103,853 B2 | 10/2018 | Moshfeghi |
| 10,199,717 B2 | 2/2019 | Rofougaran et al. |

(56) References Cited

U.S. PATENT DOCUMENTS

| | | | |
|---|---|---|---|
| 10,277,370 B2 | 4/2019 | Moshfeghi | |
| 10,320,090 B2 | 6/2019 | Zou et al. | |
| 10,348,371 B2 | 7/2019 | Rofougaran et al. | |
| 10,560,179 B2 | 2/2020 | Gharavi et al. | |
| 10,587,313 B2 | 3/2020 | Yoon et al. | |
| 10,666,326 B2 | 5/2020 | Rofougaran et al. | |
| 2002/0034958 A1 | 3/2002 | Oberschmidt et al. | |
| 2002/0132600 A1* | 9/2002 | Rudrapatna | H04B 7/10 455/277.1 |
| 2002/0193074 A1 | 12/2002 | Squibbs | |
| 2002/0196186 A1 | 12/2002 | Holt | |
| 2003/0012208 A1 | 1/2003 | Bernheim et al. | |
| 2003/0090418 A1 | 5/2003 | Howell | |
| 2003/0125040 A1 | 7/2003 | Walton et al. | |
| 2003/0129989 A1 | 7/2003 | Gholmieh et al. | |
| 2003/0236109 A1 | 12/2003 | Nagata | |
| 2004/0077354 A1 | 4/2004 | Jason et al. | |
| 2004/0077379 A1 | 4/2004 | Smith et al. | |
| 2004/0082356 A1 | 4/2004 | Walton et al. | |
| 2004/0095907 A1 | 5/2004 | Agee et al. | |
| 2004/0110469 A1 | 6/2004 | Judd et al. | |
| 2004/0116129 A1 | 6/2004 | Wilson | |
| 2004/0127174 A1 | 7/2004 | Frank et al. | |
| 2004/0166808 A1 | 8/2004 | Hasegawa et al. | |
| 2004/0204114 A1 | 10/2004 | Brennan et al. | |
| 2005/0048964 A1 | 3/2005 | Cohen et al. | |
| 2005/0069252 A1 | 3/2005 | Hwang et al. | |
| 2005/0088358 A1 | 4/2005 | Larry et al. | |
| 2005/0134517 A1 | 6/2005 | Gottl | |
| 2005/0136943 A1 | 6/2005 | Banerjee et al. | |
| 2005/0181755 A1 | 8/2005 | Hoshino et al. | |
| 2005/0232216 A1 | 10/2005 | Webster et al. | |
| 2005/0237971 A1 | 10/2005 | Skraparlis | |
| 2005/0243756 A1 | 11/2005 | Cleveland et al. | |
| 2005/0270227 A1 | 12/2005 | Stephens | |
| 2006/0025178 A1 | 2/2006 | Tao et al. | |
| 2006/0063494 A1 | 3/2006 | Zhang et al. | |
| 2006/0121946 A1 | 6/2006 | Walton et al. | |
| 2006/0246922 A1 | 11/2006 | Gasbarro et al. | |
| 2006/0267839 A1 | 11/2006 | Vaskelainen et al. | |
| 2007/0001924 A1 | 1/2007 | Hirabayashi | |
| 2007/0040025 A1 | 2/2007 | Goel et al. | |
| 2007/0052519 A1 | 3/2007 | Talty et al. | |
| 2007/0066254 A1 | 3/2007 | Tsuchie et al. | |
| 2007/0093270 A1 | 4/2007 | Lagnado | |
| 2007/0100548 A1 | 5/2007 | Small | |
| 2007/0115800 A1 | 5/2007 | Fonseka et al. | |
| 2007/0116012 A1* | 5/2007 | Chang | H04W 48/18 370/395.52 |
| 2007/0127360 A1 | 6/2007 | Song et al. | |
| 2007/0160014 A1 | 7/2007 | Larsson | |
| 2007/0280310 A1 | 12/2007 | Muenter et al. | |
| 2008/0025208 A1 | 1/2008 | Chan | |
| 2008/0026763 A1 | 1/2008 | Rensburg et al. | |
| 2008/0076370 A1 | 3/2008 | Kotecha et al. | |
| 2008/0117961 A1 | 5/2008 | Han et al. | |
| 2008/0166975 A1 | 7/2008 | Kim et al. | |
| 2008/0167049 A1 | 7/2008 | Karr et al. | |
| 2008/0212582 A1 | 9/2008 | Zwart et al. | |
| 2008/0225758 A1 | 9/2008 | Proctor et al. | |
| 2008/0258993 A1 | 10/2008 | Gummalla et al. | |
| 2008/0261509 A1 | 10/2008 | Sen | |
| 2008/0303701 A1 | 12/2008 | Zhang et al. | |
| 2008/0305820 A1 | 12/2008 | Sadiq et al. | |
| 2008/0309555 A1 | 12/2008 | Fan et al. | |
| 2008/0315944 A1 | 12/2008 | Brown | |
| 2009/0009392 A1 | 1/2009 | Jacomb-Hood et al. | |
| 2009/0010215 A1 | 1/2009 | Kim et al. | |
| 2009/0028120 A1 | 1/2009 | Lee | |
| 2009/0029645 A1 | 1/2009 | Leroudier | |
| 2009/0093265 A1 | 4/2009 | Kimura et al. | |
| 2009/0136227 A1 | 5/2009 | Lambert | |
| 2009/0156227 A1 | 6/2009 | Frerking et al. | |
| 2009/0161235 A1 | 6/2009 | Border et al. | |
| 2009/0175214 A1 | 7/2009 | Sfar et al. | |
| 2009/0195455 A1 | 8/2009 | Kim et al. | |
| 2009/0224137 A1 | 9/2009 | Hoermann | |
| 2009/0233545 A1 | 9/2009 | Sutskover et al. | |
| 2009/0296846 A1 | 12/2009 | Maru | |
| 2009/0325479 A1 | 12/2009 | Chakrabarti et al. | |
| 2010/0042881 A1 | 2/2010 | Wong | |
| 2010/0046655 A1 | 2/2010 | Lee et al. | |
| 2010/0080197 A1 | 4/2010 | Kanellakis et al. | |
| 2010/0090898 A1 | 4/2010 | Gallagher et al. | |
| 2010/0105403 A1 | 4/2010 | Lennartson et al. | |
| 2010/0117890 A1 | 5/2010 | Vook et al. | |
| 2010/0124895 A1 | 5/2010 | Martin et al. | |
| 2010/0136922 A1 | 6/2010 | Rofougaran | |
| 2010/0149039 A1 | 6/2010 | Komijani et al. | |
| 2010/0167639 A1 | 7/2010 | Ranson et al. | |
| 2010/0172309 A1 | 7/2010 | Forenza et al. | |
| 2010/0208776 A1 | 8/2010 | Song et al. | |
| 2010/0220012 A1 | 9/2010 | Reede | |
| 2010/0265925 A1 | 10/2010 | Liu et al. | |
| 2010/0266061 A1 | 10/2010 | Cheng et al. | |
| 2010/0267415 A1* | 10/2010 | Kakitsu | H04B 7/0808 455/552.1 |
| 2010/0273504 A1 | 10/2010 | Bull et al. | |
| 2010/0284446 A1 | 11/2010 | Mu et al. | |
| 2010/0291918 A1 | 11/2010 | Suzuki et al. | |
| 2010/0304680 A1 | 12/2010 | Kuffner et al. | |
| 2010/0304770 A1* | 12/2010 | Wietfeldt | H04W 72/1215 455/509 |
| 2010/0328157 A1 | 12/2010 | Culkin et al. | |
| 2011/0002410 A1 | 1/2011 | Forenza et al. | |
| 2011/0003610 A1 | 1/2011 | Key et al. | |
| 2011/0045764 A1 | 2/2011 | Maruyama et al. | |
| 2011/0063181 A1 | 3/2011 | Walker | |
| 2011/0069773 A1 | 3/2011 | Doron et al. | |
| 2011/0081875 A1 | 4/2011 | Imamura et al. | |
| 2011/0105032 A1 | 5/2011 | Maruhashi et al. | |
| 2011/0105167 A1 | 5/2011 | Pan et al. | |
| 2011/0136478 A1 | 6/2011 | Trigui | |
| 2011/0140954 A1 | 6/2011 | Fortuny-Guasch | |
| 2011/0142104 A1 | 6/2011 | Coldrey et al. | |
| 2011/0149835 A1 | 6/2011 | Shimada et al. | |
| 2011/0164510 A1 | 7/2011 | Zheng et al. | |
| 2011/0190005 A1 | 8/2011 | Cheon et al. | |
| 2011/0194504 A1 | 8/2011 | Gorokhov et al. | |
| 2011/0212684 A1 | 9/2011 | Nam et al. | |
| 2011/0222616 A1 | 9/2011 | Jiang et al. | |
| 2011/0268037 A1 | 11/2011 | Fujimoto | |
| 2011/0299441 A1 | 12/2011 | Petrovic et al. | |
| 2012/0002742 A1 | 1/2012 | Cheng | |
| 2012/0015603 A1 | 1/2012 | Proctor et al. | |
| 2012/0034924 A1 | 2/2012 | Kalhan | |
| 2012/0057508 A1 | 3/2012 | Moshfeghi | |
| 2012/0082070 A1 | 4/2012 | Hart et al. | |
| 2012/0082072 A1 | 4/2012 | Shen | |
| 2012/0083207 A1 | 4/2012 | Rofougaran et al. | |
| 2012/0083223 A1 | 4/2012 | Li et al. | |
| 2012/0083225 A1 | 4/2012 | Rofougaran et al. | |
| 2012/0083233 A1 | 4/2012 | Rofougaran et al. | |
| 2012/0083306 A1 | 4/2012 | Rofougaran et al. | |
| 2012/0093209 A1 | 4/2012 | Schmidt et al. | |
| 2012/0120884 A1 | 5/2012 | Yu et al. | |
| 2012/0129543 A1 | 5/2012 | Patel et al. | |
| 2012/0131650 A1 | 5/2012 | Gutt et al. | |
| 2012/0149300 A1 | 6/2012 | Forster | |
| 2012/0184203 A1 | 7/2012 | Tulino et al. | |
| 2012/0184219 A1 | 7/2012 | Richardson et al. | |
| 2012/0194385 A1 | 8/2012 | Schmidt et al. | |
| 2012/0206299 A1 | 8/2012 | Valdes-Garcia | |
| 2012/0224651 A1 | 9/2012 | Murakami et al. | |
| 2012/0230274 A1 | 9/2012 | Xiao et al. | |
| 2012/0238202 A1 | 9/2012 | Kim et al. | |
| 2012/0250659 A1 | 10/2012 | Sambhwani | |
| 2012/0257516 A1 | 10/2012 | Pazhyannur et al. | |
| 2012/0259547 A1 | 10/2012 | Morlock et al. | |
| 2012/0314570 A1 | 12/2012 | Forenza et al. | |
| 2013/0027240 A1 | 1/2013 | Chowdhury | |
| 2013/0027250 A1 | 1/2013 | Chen | |
| 2013/0039342 A1 | 2/2013 | Kazmi | |
| 2013/0040558 A1 | 2/2013 | Kazmi | |

(56) References Cited

U.S. PATENT DOCUMENTS

| | | |
|---|---|---|
| 2013/0044028 A1 | 2/2013 | Lea et al. |
| 2013/0057447 A1 | 3/2013 | Pivit et al. |
| 2013/0089123 A1 | 4/2013 | Rahul et al. |
| 2013/0094439 A1 | 4/2013 | Moshfeghi |
| 2013/0094440 A1 | 4/2013 | Moshfeghi |
| 2013/0094522 A1 | 4/2013 | Moshfeghi |
| 2013/0094544 A1 | 4/2013 | Moshfeghi |
| 2013/0095747 A1 | 4/2013 | Moshfeghi |
| 2013/0095770 A1 | 4/2013 | Moshfeghi |
| 2013/0095874 A1 | 4/2013 | Moshfeghi et al. |
| 2013/0114468 A1 | 5/2013 | Hui et al. |
| 2013/0155891 A1 | 6/2013 | Dinan |
| 2013/0272220 A1 | 10/2013 | Li et al. |
| 2013/0272437 A1 | 10/2013 | Eidson et al. |
| 2013/0286962 A1 | 10/2013 | Heath, Jr. et al. |
| 2013/0287139 A1 | 10/2013 | Zhu et al. |
| 2013/0322561 A1 | 12/2013 | Abreu et al. |
| 2013/0324055 A1 | 12/2013 | Kludt et al. |
| 2013/0343235 A1 | 12/2013 | Khan |
| 2014/0003338 A1 | 1/2014 | Rahul et al. |
| 2014/0010319 A1 | 1/2014 | Baik et al. |
| 2014/0016573 A1 | 1/2014 | Nuggehalli et al. |
| 2014/0035731 A1 | 2/2014 | Chan et al. |
| 2014/0044041 A1 | 2/2014 | Moshfeghi |
| 2014/0044042 A1 | 2/2014 | Moshfeghi |
| 2014/0044043 A1 | 2/2014 | Moshfeghi et al. |
| 2014/0045478 A1 | 2/2014 | Moshfeghi |
| 2014/0045541 A1 | 2/2014 | Moshfeghi et al. |
| 2014/0072078 A1 | 3/2014 | Sergeyev et al. |
| 2014/0079165 A1 | 3/2014 | Kludt et al. |
| 2014/0086191 A1 | 3/2014 | Berntsen et al. |
| 2014/0104124 A1 | 4/2014 | Chernokalov et al. |
| 2014/0125539 A1 | 5/2014 | Katipally et al. |
| 2014/0133435 A1 | 5/2014 | Forenza et al. |
| 2014/0161018 A1 | 6/2014 | Chang et al. |
| 2014/0198696 A1 | 7/2014 | Li et al. |
| 2014/0241296 A1 | 8/2014 | Shattil |
| 2014/0266866 A1 | 9/2014 | Swirhun et al. |
| 2015/0003307 A1 | 1/2015 | Moshfeghi et al. |
| 2015/0011160 A1 | 1/2015 | Jurgovan et al. |
| 2015/0031407 A1 | 1/2015 | Moshfeghi |
| 2015/0042744 A1 | 2/2015 | Ralston et al. |
| 2015/0091706 A1 | 4/2015 | Chemishkian et al. |
| 2015/0123496 A1 | 5/2015 | Leabman et al. |
| 2015/0229133 A1 | 8/2015 | Reynolds et al. |
| 2015/0241020 A1 | 8/2015 | Lee et al. |
| 2015/0296344 A1 | 10/2015 | Trojer et al. |
| 2015/0303950 A1 | 10/2015 | Shattil |
| 2015/0318897 A1 | 11/2015 | Hyde et al. |
| 2015/0318905 A1 | 11/2015 | Moshfeghi et al. |
| 2015/0341098 A1 | 11/2015 | Angeletti et al. |
| 2016/0014613 A1 | 1/2016 | Ponnampalam et al. |
| 2016/0043838 A1 | 2/2016 | Moshfeghi et al. |
| 2016/0054440 A1 | 2/2016 | Younis |
| 2016/0094092 A1 | 3/2016 | Davlantes et al. |
| 2016/0094318 A1 | 3/2016 | Shattil |
| 2016/0142114 A1 | 5/2016 | Moshfeghi et al. |
| 2016/0192400 A1 | 6/2016 | Sohn et al. |
| 2016/0197665 A1 | 7/2016 | Moshfeghi et al. |
| 2016/0203347 A1 | 7/2016 | Bartholomew et al. |
| 2016/0211905 A1 | 7/2016 | Moshfeghi et al. |
| 2016/0219567 A1 | 7/2016 | Gil et al. |
| 2016/0285481 A1 | 9/2016 | Cohen |
| 2017/0026218 A1 | 1/2017 | Shattil |
| 2017/0062944 A1 | 3/2017 | Zimmerman et al. |
| 2017/0078897 A1 | 3/2017 | Duan et al. |
| 2017/0126374 A1 | 5/2017 | Moshfeghi et al. |
| 2017/0156069 A1 | 6/2017 | Moshfeghi et al. |
| 2017/0201437 A1 | 7/2017 | Balakrishnan et al. |
| 2017/0212208 A1 | 7/2017 | Baek et al. |
| 2017/0230099 A1 | 8/2017 | Moshfeghi et al. |
| 2017/0237290 A1 | 8/2017 | Bakker et al. |
| 2017/0257155 A1 | 9/2017 | Liang et al. |
| 2017/0264014 A1 | 9/2017 | Le-Ngoc |
| 2017/0279573 A1 | 9/2017 | Moshfeghi et al. |
| 2017/0288727 A1 | 10/2017 | Rappaport |
| 2017/0317734 A1 | 11/2017 | Moshfeghi |
| 2017/0317801 A1 | 11/2017 | Moshfeghi et al. |
| 2017/0324480 A1 | 11/2017 | Elmirghani et al. |
| 2017/0332249 A1 | 11/2017 | Guey et al. |
| 2017/0338921 A1 | 11/2017 | Moshfeghi |
| 2017/0339625 A1 | 11/2017 | Stapleton |
| 2017/0353338 A1 | 12/2017 | Amadjikpe et al. |
| 2018/0026586 A1 | 1/2018 | Carbone et al. |
| 2018/0041270 A1 | 2/2018 | Buer et al. |
| 2018/0048390 A1 | 2/2018 | Palmer et al. |
| 2018/0063139 A1 | 3/2018 | Day et al. |
| 2018/0090992 A1 | 3/2018 | Shrivastava et al. |
| 2018/0091270 A1 | 3/2018 | Moshfeghi |
| 2018/0109303 A1 | 4/2018 | Yoo et al. |
| 2018/0115305 A1 | 4/2018 | Islam et al. |
| 2018/0176799 A1 | 6/2018 | Lange et al. |
| 2018/0183152 A1 | 6/2018 | Turpin et al. |
| 2018/0220416 A1 | 8/2018 | Islam et al. |
| 2018/0234158 A1 | 8/2018 | Moshfeghi |
| 2019/0089434 A1 | 3/2019 | Rainish et al. |
| 2019/0123866 A1 | 4/2019 | Moshfeghi |
| 2019/0230626 A1 | 7/2019 | Rune et al. |
| 2019/0319754 A1 | 10/2019 | Moshfeghi |
| 2019/0319755 A1 | 10/2019 | Moshfeghi |
| 2019/0319756 A1 | 10/2019 | Moshfeghi |
| 2020/0076491 A1 | 3/2020 | Zhang et al. |
| 2020/0145079 A1 | 5/2020 | Marinier et al. |

FOREIGN PATENT DOCUMENTS

| | | |
|---|---|---|
| WO | 2008027531 A2 | 3/2008 |
| WO | 2012055468 A1 | 5/2012 |
| WO | 2013058998 A2 | 4/2013 |
| WO | 2013058999 A2 | 4/2013 |
| WO | 2016115545 A2 | 7/2016 |

OTHER PUBLICATIONS

Patent Board Decision—Examiner Affirmed in Part for U.S. Appl. No. 13/473,160 dated Feb. 21, 2017.

Patent Board Decision—Examiner Reversed for U.S. Appl. No. 13/919,932 dated Dec. 19, 2017.

Response to Rule 312 Communication for U.S. Appl. No. 15/834,894 dated Apr. 19, 2019; Miscellaneous Communication to Applicant for U.S. Appl. No. 15/834,894 dated Apr. 19, 2019.

Restriction Requirement for U.S. Appl. No. 15/893,626 dated Aug. 12, 2016.

Shimin Gong et al., "Backscatter Relay Communications Powered by Wireless Energy Beamforming," IEEE Trans. on Communication, 2018.

USPTO Miscellaneous communication for U.S. Appl. No. 15/834,894 dated Apr. 19, 2019.

Zeng et al., "Joint relay selection and beamforming for mmWave fronthauling network," 2017 IEEE/CIC International Conference on Communications in China, Oct. 22, 2017, 6 pages.

Corrected Notice of Allowance for U.S. Appl. No. 16/031,007 dated Sep. 16, 2019.

Corrected Notice of Allowance for U.S. Appl. No. 15/616,911 dated Oct. 31, 2019.

Corrected Notice of Allowance for U.S. Appl. No. 16/031,007 dated Oct. 22, 2019.

Corrected Notice of Allowance for U.S. Appl. No. 16/032,617 dated Oct. 28, 2019.

Corrected Notice of Allowance for U.S. Appl. No. 16/129,423 dated Nov. 7, 2019.

Misc Communication from USPTO for U.S. Appl. No. 16/382,386 dated Oct. 8, 2019.

Non-Final Office Action for U.S. Appl. No. 16/231,903 dated Sep. 18, 2019.

Non-Final Office Action for U.S. Appl. No. 16/294,025 dated Sep. 12, 2019.

Non-Final Office Action for U.S. Appl. No. 16/377,980 dated Aug. 21, 2019.

(56) References Cited

OTHER PUBLICATIONS

Non-Final Office Action for U.S. Appl. No. 16/526,544 dated Sep. 18, 2019.
Non-Final Office Action in U.S. Appl. No. 15/836,198 dated Oct. 31, 2019.
Notice of Allowance for U.S. Appl. No. 16/032,668 dated Sep. 20, 2019.
Notice of Allowance for U.S. Appl. No. 15/595,919 dated Oct. 25, 2019.
Notice of Allowance for U.S. Appl. No. 15/904,521 dated Sep. 20, 2019.
Notice of Allowance for U.S. Appl. No. 16/111,326 dated Oct. 10, 2019.
Non-Final Office Action for U.S. Appl. No. 16/016,619 dated Sep. 25, 2018.
Baggett, Benjamin M.W. Optimization of Aperiodically Spaced Phased Arrays for Wideband Applications. MS Thesis. Virginia Polytechnic Institute and State University, 2011. pp. 1-137.
Corrected Notice of Allowability for U.S. Appl. No. 15/904,521 dated May 6, 2019.
Corrected Notice of Allowance for U.S. Appl. No. 16/031,007 dated Jul. 8, 2019.
Corrected Notice of Allowance for U.S. Appl. No. 15/607,743 dated May 10, 2019.
Corrected Notice of Allowance for U.S. Appl. No. 15/904,521 dated Jun. 21, 2019.
Corrected Notice of Allowance for U.S. Appl. No. 15/904,521 dated May 10, 2019.
Corrected Notice of Allowance for U.S. Appl. No. 13/473,180 dated Jun. 11, 2014.
Corrected Notice of Allowance for U.S. Appl. No. 15/904,521.
Corrected Notice of Allowance for U.S. Appl. No. 16/031,007 dated Aug. 5, 2019.
Corrected Notice of Allowance in U.S. Appl. No. 15/607,743 dated Apr. 3, 2019.
Corrected Notice of Allowance in U.S. Appl. No. 15/835,971 dated Jul. 23, 2018.
Dennis R Morgan et al., "A same-frequency cellular repeater using adaptive feedback cancellation," Global Communications Conference (GLOBECOM), 2012 IEEE, IEEE, (2012) XP032375270, pp. 3825-3830, 2012.
Ex Parte Quayle Action for U.S. Appl. No. 16/032,668 dated Jul. 10, 2019.
Examiner's Answer to Appeal Brief for U.S. Appl. No. 13/473,144 dated Jul. 26, 2017.
Examiner's Answer to Appeal Brief for U.S. Appl. No. 13/473,160 dated Dec. 24, 2015.
Examiner's Answer to Appeal Brief for U.S. Appl. No. 13/919,932 dated Jan. 10, 2017.
Final Office Action for U.S. Appl. No. 13/473,144 dated Jul. 28, 2016.
Final Office Action for U.S. Appl. No. 13/473/144 dated Aug. 14, 2014.
Final Office Action for U.S. Appl. No. 13/919,932 dated Oct. 23, 2015.
Final Office Action for U.S. Appl. No. 13/919,972 dated Jan. 21, 2016.
Final Office Action for U.S. Appl. No. 14/940,130 dated Oct. 14, 2016.
Final Office Action for U.S. Appl. No. dated Oct. 22, 2014.
International Preliminary Report on Patentability for International Patent PCT/US2012/058839, 5 pages, dated Apr. 22, 2014.
International Preliminary Report on Patentability for International Patent PCT/US2012/058839, dated Apr. 22, 2014.
International Preliminary Report on Patentability for International Patent PCT/US2012/058842, 5 pages, dated Apr. 22, 2014.
International Search Report and the Written Opinion of the International Searching Authority in International application No. PCT/US12/58842, 6 pages, dated Jan. 4, 2013.
International Search Report and the Written Opinion of the International Searching Authority in International application No. PCT/US12/58839, 6 pages, dated Apr. 4, 2013.
International Search Report in PCT/US2018/064184 dated Jul. 1, 2019.
Invitation to Pay Additional Fees and, Where Applicable, Protest Fee, with Partial Search Report for PCT Appl No. PCT/US2018/064184 dated Apr. 10, 2019.
K. Flan and K. Huang, "Wirelessly Powered Backscatter Communication networks: Modeling, Coverage and Capacity," Apr. 9, 2016, Arxiv.com.
List of References and considered by Applicant for U.S. Appl. No. 14/325,218 dated Apr. 21, 2017.
Non-Final Office Action for U.S. Appl. No. 13/473,083 dated Mar. 3, 2014.
Non-Final Office Action for U.S. Appl. No. 13/473,096 dated Apr. 23, 2014.
Non-Final Office Action for U.S. Appl. No. 13/473,096 dated Dec. 9, 2013.
Non-Final Office Action for U.S. Appl. No. 13/473,096 dated Nov. 3, 2014.
Non-Final Office Action for U.S. Appl. No. 13/473,105 dated Nov. 25, 2013.
Non-Final Office Action for U.S. Appl. No. 13/473,113 dated Oct. 2, 2014.
Non-Final Office Action for U.S. Appl. No. 13/473,144 dated Feb. 6, 2014.
Non-Final Office Action for U.S. Appl. No. 13/473,144 dated Feb. 9, 2015.
Non-Final Office Action for U.S. Appl. No. 13/473,144 dated Oct. 7, 2015.
Non-Final Office Action for U.S. Appl. No. 13/473,160 dated Jan. 15, 2014.
Non-Final Office Action for U.S. Appl. No. 13/473,180 dated Sep. 12, 2013.
Non-Final Office Action for U.S. Appl. No. 13/919,922 dated Jan. 30, 2015.
Non-Final Office Action for U.S. Appl. No. 13/919,932 dated Feb. 6, 2015.
Non-Final Office Action for U.S. Appl. No. 13/919,958 dated Jan. 5, 2015.
Non-Final Office Action for U.S. Appl. No. 13/919,967 dated Feb. 9, 2015.
Non-Final Office Action for U.S. Appl. No. 13/919,972 dated Jun. 4, 2015.
Non-Final Office Action for U.S. Appl. No. 14/455,859 dated Nov. 13, 2015.
Non-Final Office Action for U.S. Appl. No. 14/709,136 dated Sep. 28, 2016.
Non-Final Office Action for U.S. Appl. No. 14/813,058 dated Jun. 10, 2016.
Non-Final Office Action for U.S. Appl. No. 14/940,130 dated Apr. 6, 2016.
Non-Final Office Action for U.S. Appl. No. 14/980,281 dated Apr. 20, 2016.
Non-Final Office Action for U.S. Appl. No. 14/980,338 dated Mar. 14, 2017.
Non-Final Office Action for U.S. Appl. No. 15/229,135 dated Dec. 21, 2017.
Non-Final Office Action for U.S. Appl. No. 15/372,417 dated May 3, 2018.
Non-Final Office Action for U.S. Appl. No. 15/441,209 dated Jul. 3, 2018.
Non-Final Office Action for U.S. Appl. No. 15/595,940 dated Nov. 17, 2017.
Non-Final Office Action for U.S. Appl. No. 15/616,911 dated Jan. 3, 2019.
Non-Final Office Action for U.S. Appl. No. 15/706,759 dated Jun. 12, 2018.
Non-Final Office Action for U.S. Appl. No. 15/893,626 dated Jun. 12, 2018.
Non-Final Office Action for U.S. Appl. No. 16/101,044 dated Dec. 26, 2018.

(56) References Cited

OTHER PUBLICATIONS

Non-Final Office Action for U.S. Appl. No. 16/125,757 dated Aug. 9, 2019.
Non-Final Office Action for U.S. Appl. No. 16/129,423 dated Feb. 4, 2019.
Non-Final Office Action in U.S. Appl. No. 15/432,091 dated Nov. 22, 2017.
Non-Final Office Action in U.S. Appl. No. 16/111,326 dated Mar. 1, 2019.
Notice of Allowance for U.S. Appl. No. 13/473,083 dated Jan. 7, 2015.
Notice of Allowance for U.S. Appl. No. 13/473,096 dated Apr. 17, 2015.
Notice of Allowance for U.S. Appl. No. 13/473,105 dated Jun. 10, 2014.
Notice of Allowance for U.S. Appl. No. 13/473,113 dated Aug. 10, 2015.
Notice of Allowance for U.S. Appl. No. 13/473,160 dated May 25, 2017.
Notice of Allowance for U.S. Appl. No. 13/473,180 dated May 1, 2014.
Notice of Allowance for U.S. Appl. No. 13/919,922 dated Oct. 27, 2015.
Notice of Allowance for U.S. Appl. No. 13/919,932 dated Feb. 28, 2018.
Notice of Allowance for U.S. Appl. No. 13/919,958 dated Sep. 2, 2015.
Notice of Allowance for U.S. Appl. No. 13/919,967 dated Jul. 29, 2019.
Notice of Allowance for U.S. Appl. No. 13/919,972 dated Dec. 20, 2016.
Notice of Allowance for U.S. Appl. No. 14/325,218 dated Dec. 19, 2016.
Notice of Allowance for U.S. Appl. No. 14/455,859 dated Apr. 20, 2016.
Notice of Allowance for U.S. Appl. No. 14/709,136 dated Feb. 16, 2017.
Notice of Allowance for U.S. Appl. No. 14/813,058 dated Nov. 7, 2016.
Notice of Allowance for U.S. Appl. No. 14/940,130 dated Feb. 1, 2017.
Notice of Allowance for U.S. Appl. No. 14/980,281 dated Feb. 7, 2017.
Notice of Allowance for U.S. Appl. No. 14/980,338 dated Feb. 22, 2018.
Notice of Allowance for U.S. Appl. No. 15/229,135 dated May 22, 2018.
Notice of Allowance for U.S. Appl. No. 15/372,417 dated Dec. 7, 2018.
Notice of Allowance for U.S. Appl. No. 15/441,209 dated Dec. 28, 2018.
Notice of Allowance for U.S. Appl. No. 15/472,148 dated Dec. 10, 2018.
Notice of Allowance for U.S. Appl. No. 15/595,919 dated Jun. 5, 2019.
Notice of Allowance for U.S. Appl. No. 15/595,940 dated May 1, 2018.
Notice of Allowance for U.S. Appl. No. 15/616,911 dated Jul. 24, 2019.
Notice of Allowance for U.S. Appl. No. 16/129,423 dated Jul. 15, 2019.
Notice of Allowance for U.S. Appl. No. 16/382,386 dated Jul. 24, 2019.
Notice of Allowance for U.S. Appl. No. 16/031,007 dated May 2, 2019.
Notice of Allowance in U.S. Appl. No. 15/432,091 dated Apr. 11, 2018.
Notice of Allowance in U.S. Appl. No. 15/607,743 dated Jan. 22, 2019.
Notice of Allowance in U.S. Appl. No. 15/834,894 dated Feb. 20, 2019.
Notice of Allowance in U.S. Appl. No. 15/835,971 dated May 29, 2018.
Notice of Allowance in U.S. Appl. No. 15/904,521 dated Mar. 20, 2019.
Notice of Allowance issued in U.S. Appl. No. 16/129,423 dated Jul. 15, 2019.
Corrected Notice of Allowability for U.S. Appl. No. 16/111,326 dated Mar. 9, 2020.
Corrected Notice of Allowance for U.S. Appl. No. 16/526,544 dated May 13, 2020.
Corrected Notice of Allowance for U.S. Appl. No. 15/836,198 dated May 22, 2020.
Corrected Notice of Allowance for U.S. Appl. No. 15/904,521 dated Mar. 12, 2020.
Corrected Notice of Allowance for U.S. Appl. No. 16/032,668 dated Mar. 23, 2020.
Corrected Notice of Allowance for U.S. Appl. No. 16/111,326 dated Apr. 23, 2020.
Corrected Notice of Allowance for U.S. Appl. No. 16/294,025 dated May 18, 2020.
Final Office Action for U.S. Appl. No. 15/256,222 dated Oct. 4, 2019.
Final Office Action for U.S. Appl. No. 16/377,980 dated Mar. 4, 2020.
Final Office Action for U.S. Appl. No. 16/388,043 dated Apr. 15, 2020.
Non-Final Office Action for U.S. Appl. No. 15/256,222 dated Aug. 27, 2018.
Non-Final Office Action for U.S. Appl. No. 15/256,222 dated Mar. 21, 2019.
Non-Final Office Action for U.S. Appl. No. 16/125,757 dated Mar. 23, 2020.
Non-Final Office Action for U.S. Appl. No. 16/153,735 dated May 13, 2020.
Non-Final Office Action for U.S. Appl. No. 16/364,956 dated Apr. 10, 2020.
Non-Final Office Action for U.S. Appl. No. 16/377,847 dated Apr. 20, 2020.
Non-Final Office Action for U.S. Appl. No. 16/675,290 dated Apr. 30, 2020.
Notice of Allowance for U.S. Appl. No. 15/256,222 dated Apr. 3, 2020.
Notice of Allowance for U.S. Appl. No. 15/607,750 dated Jun. 1, 2020.
Notice of Allowance for U.S. Appl. No. 15/836,198 dated Apr. 17, 2020.
Notice of Allowance for U.S. Appl. No. 16/231,903 dated Mar. 24, 2020.
Notice of Allowance for U.S. Appl. No. 16/377,980 dated Apr. 14, 2020.
Notice of Allowance for U.S. Appl. No. 16/526,544 dated Apr. 9, 2020.
Supplemental Notice of Allowance for U.S. Appl. No. 16/129,423 dated Mar. 3, 2020.
Supplemental Notice of Allowance for U.S. Appl. No. 16/231,903 dated Apr. 30, 2020.
Supplemental Notice of Allowance for U.S. Appl. No. 16/294,025 dated Mar. 25, 2020.
Corrected Notice of Allowance for U.S. Appl. No. 16/382,386 dated Dec. 30, 2019.
Corrected Notice of Allowance for U.S. Appl. No. 15/616,911 dated Jan. 24, 2020.
Corrected Notice of Allowance for U.S. Appl. No. 15/616,911 dated Dec. 12, 2019.
Corrected Notice of Allowance for U.S. Appl. No. 15/904,521 dated Jan. 8, 2020.
Corrected Notice of Allowance for U.S. Appl. No. 16/032,617 dated Jan. 9, 2020.
Corrected Notice of Allowance for U.S. Appl. No. 16/032,668 dated Dec. 30, 2019.

(56) References Cited

OTHER PUBLICATIONS

Corrected Notice of Allowance for U.S. Appl. No. 16/129,423 dated Jan. 23, 2020.
Corrected Notice of Allowance for U.S. Appl. No. 16/382,386 dated Feb. 6, 2020.
Final Office Action for U.S. Appl. No. 16/125,757 dated Dec. 2, 2019.
Final Office Action for U.S. Appl. No. 16/526,544 dated Feb. 12, 2020.
Non-Final Office Action for U.S. Appl. No. 16/388,043 dated Dec. 27, 2019.
Non-Final Office Action for U.S. Appl. No. 16/666,680 dated Feb. 19, 2020.
Notice of Allowance for U.S. Appl. No. 16/129,423 dated Nov. 27, 2019.
Notice of Allowance for U.S. Appl. No. 16/294,025 dated Jan. 13, 2020.
Supplemental Notice of Allowance for U.S. Appl. No. 16/032,668 dated Feb. 14, 2020.
Corrected Notice of Allowability for U.S. Appl. No. 15/256,222 dated Jul. 10, 2020.
Corrected Notice of Allowability for U.S. Appl. No. 16/377,980 dated Jul. 22, 2020.
Corrected Notice of Allowability for U.S. Appl. No. 16/526,544 dated Jul. 16, 2020.
Corrected Notice of Allowance for U.S. Appl. No. 16/526,544 dated Aug. 25, 2020.
Final Office Action for U.S. Appl. No. 16/125,757 dated Jul. 15, 2020.
Final Office Action for U.S. Appl. No. 16/377,847 dated Jul. 13, 2020.
Final Office Action for U.S. Appl. No. 16/666,680 dated Jun. 29, 2020.
Non-Final Office Action for U.S. Appl. No. 16/204,397 dated Sep. 17, 2020.
Non-Final Office Action for U.S. Appl. No. 16/388,043 dated Aug. 3, 2020.
Non-Final Office Action for U.S. Appl. No. 16/451,998 dated Sep. 11, 2020.
Non-Final Office Action for U.S. Appl. No. 16/452,023 dated Sep. 9, 2020.
Non-Final Office Action for U.S. Appl. No. 16/819,388 dated Jul. 2, 2020.
Non-Final Office Action for U.S. Appl. No. 16/866,536 dated Sep. 1, 2020.
Notice of Allowance for U.S. Appl. No. 16/153,735 dated Jul. 2, 2020.
Notice of Allowance for U.S. Appl. No. 16/684,789 dated Jul. 10, 2020.
Supplemental Notice of Allowability for U.S. Appl. No. 16/153,735 dated Jul. 22, 2020.
Supplemental Notice of Allowance for U.S. Appl. No. 16/231,903 dated Jul. 1, 2020.
Corrected Notice of Allowance for U.S. Appl. No. 15/256,222 dated Oct. 28, 2020.
Corrected Notice of Allowance for U.S. Appl. No. 15/836,198 dated Oct. 2, 2020.
Corrected Notice of Allowance for U.S. Appl. No. 16/377,980 dated Oct. 5, 2020.
Corrected Notice of Allowance for U.S. Appl. No. 16/526,544 dated Sep. 25, 2020.
Final Office Action for U.S. Appl. No. 16/364,956 dated Oct. 2, 2020.
Non-Final Office Action for U.S. Appl. No. 16/233,044 dated Oct. 14, 2020.
Non-Final Office Action for U.S. Appl. No. 16/398,156 dated Oct. 15, 2020.
Non-Final Office Action for U.S. Appl. No. 16/461,980 dated Sep. 21, 2020.
Non-Final Office Action for U.S. Appl. No. 16/689,758 dated Sep. 29, 2020.
Notice of Allowance for U.S. Appl. No. 16/125,757 dated Oct. 28, 2020.
Notice of Allowance for U.S. Appl. No. 16/388,043 dated Nov. 5, 2020.
Notice of Allowance for U.S. Appl. No. 16/927,470 dated Oct. 29, 2020.
Supplemental Notice of Allowance for U.S. Appl. No. 16/153,735 dated Oct. 9, 2020.
Corrected Notice of Allowance for U.S. Appl. No. 16/153,735 dated Nov. 18, 2020.
Corrected Notice of Allowance for U.S. Appl. No. 16/388,043 dated Dec. 24, 2020.
Corrected Notice of Allowance for U.S. Appl. No. 16/675,290 dated Dec. 16, 2020.
Corrected Notice of Allowance for U.S. Appl. No. 16/684,789 dated Nov. 20, 2020.
Non-Final Office Action for U.S. Appl. No. 16/377,847 dated Dec. 14, 2020.
Non-Final Office Action for U.S. Appl. No. 16/666,680 dated Nov. 13, 2020.
Non-Final Office Action for U.S. Appl. No. 16/941,690 dated Nov. 12, 2020.
Notice of Allowance for U.S. Appl. No. 16/364,956 dated Dec. 11, 2020.
Notice of Allowance for U.S. Appl. No. 16/452,023 dated Nov. 16, 2020.

\* cited by examiner

METHOD AND SYSTEM FOR PROVIDING DIVERSITY IN A NETWORK THAT UTILIZES DISTRIBUTED TRANSCEIVERS WITH ARRAY PROCESSING

CLAIM OF PRIORITY

This patent application makes reference to, claims priority to and claims benefit from U.S. Provisional Application Ser. No. 61/548,201 filed on Oct. 17, 2011.

The above stated application is hereby incorporated herein by reference in its entirety.

CROSS-REFERENCE TO RELATED APPLICATIONS/INCORPORATION BY REFERENCE

This patent application is a continuation application of U.S. patent application Ser. No. 15/706,759, entitled "METHOD AND SYSTEM FOR PROVIDING DIVERSITY IN A NETWORK THAT UTILIZES DISTRIBUTED TRANSCEIVERS WITH ARRAY PROCESSING," filed Sep. 17, 2017, published as U.S. Patent Publication 2018/0091270. U.S. patent application Ser. No. 15/706,759 is a continuation application of U.S. patent application Ser. No. 13/473,160, entitled "METHOD AND SYSTEM FOR PROVIDING DIVERSITY IN A NETWORK THAT UTILIZES DISTRIBUTED TRANSCEIVERS WITH ARRAY PROCESSING," filed May 16, 2016, issued as U.S. Pat. No. 9,780,928. U.S. patent application Ser. No. 13/473,160 makes reference to, claims priority to and claims benefit from U.S. Provisional Application No. 61/548,201 filed on Oct. 17, 2011. The contents of U.S. patent application Ser. No. 15/706,759, published as U.S. Patent Publication 2018/0091270; U.S. patent application Ser. No. 13/473,160, issued as U.S. Pat. No. 9,780,928; and U.S. Provisional Application No. 61/548,201 are hereby incorporated by reference.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to communications. More specifically, certain embodiments of the invention relate to a method and a system for providing diversity in a network that utilizes distributed transceivers with array processing.

BACKGROUND OF THE INVENTION

Millimeter Wave (mmWave) devices are being utilized for high throughput wireless communications at very high carrier frequencies. There are several standards bodies such as 60 GHz wireless standard, WirelessHD, WiGig, and WiFi IEEE 802.11ad that utilize high frequencies such as the 60 GHz frequency spectrum for high throughput wireless communications. In the US, the 60 GHz spectrum band may be used for unlicensed short range data links such as, for example, data links within a range of 1.7 km, with data throughputs up to 6 Gbits/s. These higher frequencies may provide smaller wavelengths and enable the use of small high gain antennas. However, these higher frequencies may experience high propagation loss. A new emerging application for mmWave communication is enabling fixed wireless links between a group of stations with or without line-of-sight. Another application for mmWave communication is providing the link between the base stations and end mobile users in cellular networks.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for providing diversity for link reliability or improved range/throughput in a network that utilizes distributed transceivers with array processing is disclosed, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for providing diversity in a network that utilizes distributed transceivers with array processing. In various embodiments of the invention, a communication device that comprises a plurality of distributed transceivers, a central processor and a network management engine may be configured to operate in one or more diversity modes. In this regard, configuring the communication device for diversity mode of operation may comprise configuring a plurality of communication modules (or blocks) from one or more of the plurality of distributed transceivers. The configuration may be based on a particular diversity mode, and each of the plurality of communication modules may comprise one or more antennas or antenna array elements, and one or more of the plurality of distributed transceivers associated with the one or more antennas or antenna array elements. The plurality of communication modules may then be utilized to concurrently communicate data streams from and/or to the communication device.

In some instances, each of the concurrently communicated data streams may comprise the same data—i.e., for redundant communication of the same data stream. The communication device may switch among a plurality of diversity modes, including during communication operations, and one or more of the plurality of communication modules may be reconfigured, dynamically, based on the switching. In this regard, the plurality of diversity modes may comprise spatial diversity mode, frequency diversity mode, and polarization diversity mode. The communication device may monitor a plurality of communication related parameters or conditions associated with and/or affecting the configuration of the plurality of communication modules. In this regard, the communication related parameters and/or conditions may pertain to link quality and/or propagation environment. The communication device may then select the diversity mode, to determine whether to switch to and/or incorporate another diversity mode, based on the monitoring. In some instances, the communication device may configure, based on the location of one or more reflectors, beamforming settings and/or antenna arrangement for one or more of the plurality of communication modules. Furthermore, the communication device may determine and/or select connection types and/or communication protocols that are used in establishing one or more links via the plurality of communication modules, for communicating the data streams. The communication device may allocate communication resources to the plurality of communication modules for use during the communication of the data streams. At least some of the allocated resources may be shared among the plurality of communication modules.

Figure 1:
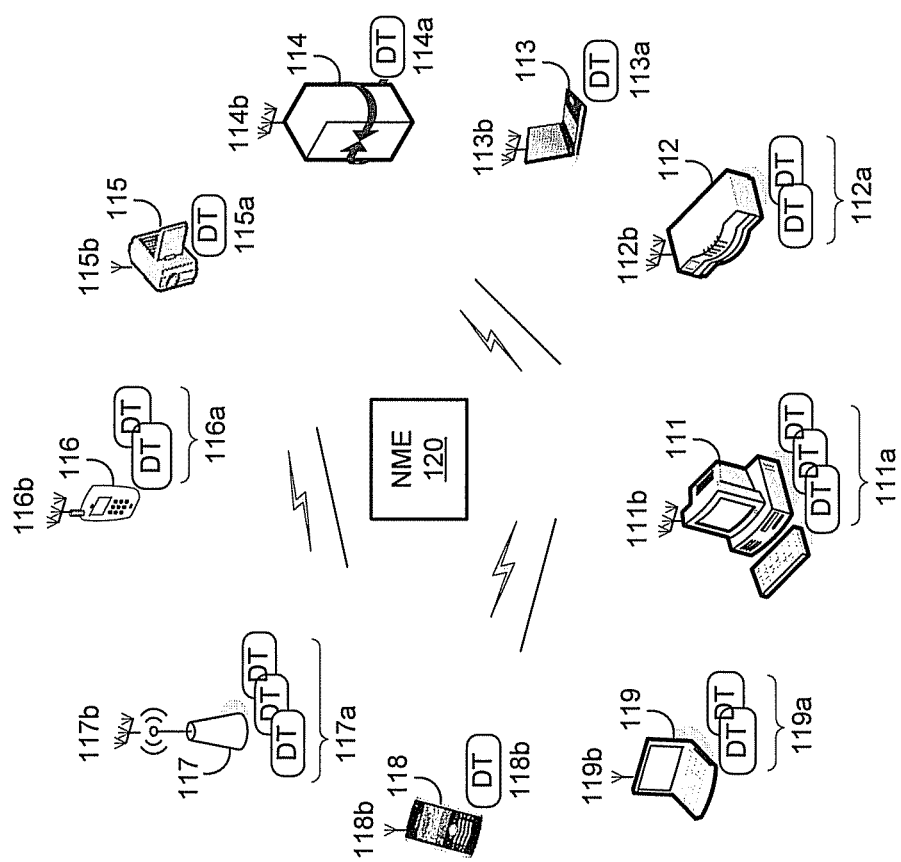
FIG. 1 is a block diagram illustrating an exemplary communication system that supports use and central management of distributed transceivers, in accordance with an embodiment of the invention.

FIG. 1 is a block diagram illustrating an exemplary communication system that supports use and central management of distributed transceivers, in accordance with an embodiment of the invention. Referring to FIG. 1, there is shown a communication network 100 comprising a plurality of application devices, of which application devices 111-119 are displayed.

The application devices 111-119 may comprise suitable logic, circuitry, code, and/or interfaces that may be operable to communicate voice and data with one to another over wired and/or wireless connections. In an exemplary embodiment of the invention, each of the application devices 111-119 in the communication network 100 may comprise one or more distributed transceivers (DTs) for communication in the communication network 100. For example, distributed transceivers 111a through 119a may be integrated in the application devices 111 through 119, respectively, and utilized for receiving and transmitting signals. Each distributed transceiver may be equipped with an independently configurable antenna or antenna array that is operable to transmit and receive signals over the air. For example, the distributed transceivers 111a each may be equipped with an independently configurable antenna array 111b, and the distributed transceiver 118a, however, may be equipped with a single independently configurable antenna 118b to transmit and receive signals over the air. Depending on device capabilities and user preferences, distributed transceivers such as the distributed transceivers 111a within the application device 111, for example, may comprise radios such as a millimeter Wave (mmWave), a WLAN, WiMax, Bluetooth, Bluetooth Low Energy (BLE), cellular radios, WiMAX radio, or other types of radios. In this regard, radios such as mmWave radios may be utilized at very high carrier frequencies for high throughput wireless communications. Some devices may be conventional devices which may not utilize any distributed transceiver capability. In such cases, one end of the link may utilize distributed transceivers while the other end of the link does not do so (i.e., allowing for backward compatibility mode of operation, such as when communicating with legacy systems/devices).

In operation, the distributed transceivers 111a through 119a in the communication network 100 are physically positioned and oriented at different locations within corresponding application devices such like laptop, TV, gateway and/or set-top box. The distributed transceivers 111a through 119a may be centrally managed by a single network management engine (NME) 120 of the communication network 100. In an exemplary embodiment of the invention, the network management engine 120 may reside within a specific application device in the communication network 100. The network management engine 120 may be centralized as a full software implementation on a separate and/or remote network microprocessor, for example. In an exemplary embodiment of the invention, an application device in the communication network 100 may act or function as a master application device or an end-user application device. An application device that comprises the network management engine 120 and/or may have access to manage or control the network management engine 120 to dynamically configure and manage operation of the entire distributed transceivers in the communication network 100 is referred to a master application device. An application device that does not comprise the network management engine 120 and/or may have no access to manage or control the network management engine 120 is referred to as an end-user application device. The exchange of data/information required for network management operation may be performed over different links, such as 60 GHz, Bluetooth, and/or WLAN for example.

In some instances, the application device 111 acts as a master application device in the communication network 100. In an exemplary embodiment of the invention, the network management engine 120 in the master application device 111 may be utilized to configure, control, and manage the entire distributed transceivers 111a through 119a in the communication network 100 to optimize network performance. The application devices 111-119 each may operate in a transmission mode or in a receiving mode. In instances where the master application device 111 is transmitting multimedia information such as images, video, voice, as well as any other form of data to one or more receiving devices such as the end-user application devices 112-116, the network management engine 120 in the master application device 111 may be enabled to monitor and collect corresponding communication environment information from the end-user application devices 112-116. The collected communication environment information may comprise propagation environment conditions, link quality, device capabilities, antenna polarization, radiation pattern, antenna spacing, array geometry, device locations, target throughput, and/or application QoS requirements reported. The network management engine 120 may be operable to dynamically configure the distributed transceivers 111a-116a and associated antenna or antenna array 111b-116b, and to coordinate and manage the operation of the distributed transceivers 111a-116a and associated antenna or antenna array 111b-116b based on the collected communication environment information supplied from the end-user application devices 112-116. In this regard, the network management engine 120 may configure a single application device such as the application device 117 to maintain continuous connection with multiple different application devices such as the application devices 111-113.

The application device capabilities may comprise battery life, number of transceivers, number of antennas per transceiver, device interface types, processing protocols, service types, service classes and/or service requirements. The interface types for the application devices 111-119 may comprise access interface types such as Multimedia over Coax Alliance (MoCA), WiFi, Bluetooth, Ethernet, Femtocell, and/or cordless. The processing protocols may comprise service layer protocols, IP layer protocols and link layer protocols, as specified, for example, in the Open Systems Interconnect (OSI) model. The service layer protocols may comprise secure protocols such as Secure Socket Layer (SSL) and control protocols such as Spanning Tree Protocol (STP). The IP layer protocols may comprise IP signaling protocols such as SIP and H.323, and IP media transport protocols such as TCP, UDP, RTP, RTC and RTCP. The link layer protocols may comprise technology-specific PHY and MAC layer protocols such as, for example, Multimedia over Coax Alliance (MoCA), WiFi, Ethernet, Femtocell, and/or cordless.

Although communication among the application devices 111-119 with one or more distributed transceivers is illustrated in FIG. 1, the invention may not be so limited. Accordingly, an application device may be operable to utilize one or more associated distributed transceivers to communicate with one or more application devices with normal transceivers without departing from the spirit and scope of various embodiments of the invention.

In an exemplary aspect of the invention, the application devices 111-119 may be operable to utilize various diversity mechanisms, such as to reduce interference among distributed transceivers (or antennas) within these devices and/or to enhance communications between the devices. In this regard, the distributed transceivers of the application devices 111-119 may be configured to operate utilizing, for example, spatial diversity, frequency diversity, and/or polarization diversity. For example, a particular diversity mode may be selected, and the distributed transceivers, and/or their antennas, may be configured based the selected diversity mode, to enhance communication in each of the application devices 111-119 by reducing the interference among transceivers and/or antennas, and/or to optimize or enhance communication performance (e.g., link throughput or quality or reliability) and/or resource use. The selection of applicable diversity mode(s), and/or determining and/or setting various settings associated with the selected diversity mode(s) may be based on communication environment information, which may be collected by the network management engine 120.

In some embodiments, the distributed transceivers of the application devices 111-119 may be configured based on multiple diversity modes. For example, the distributed transceivers of a particular device (e.g., application device 111) may be configured such that the antennas utilized for each particular communication link have spatial diversity, frequency diversity, and polarization diversity compared to the remaining antennas of the device.

Figure 2:
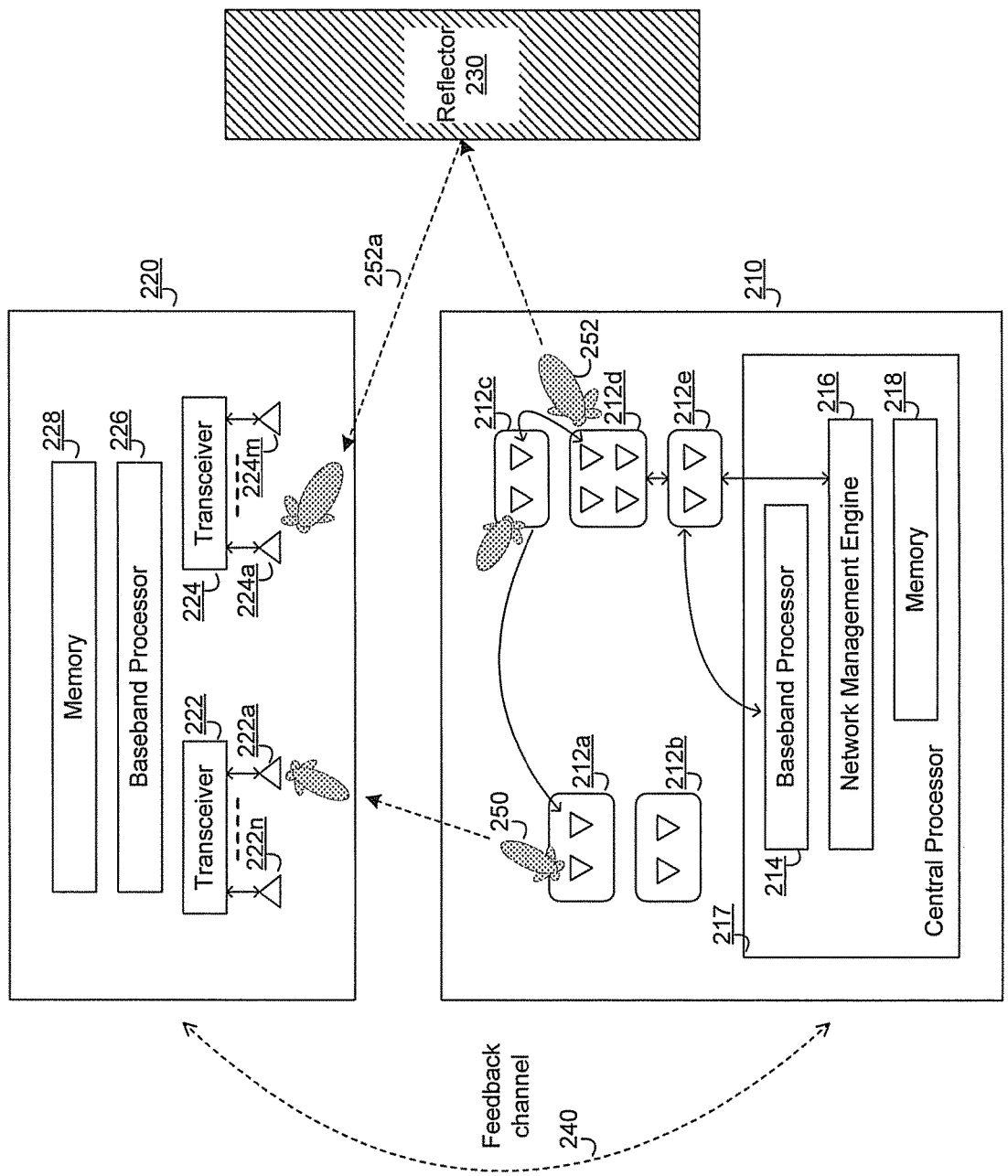
FIG. 2 is a diagram that illustrates an exemplary usage scenario where distributed transceivers are centrally managed to create a high-performance link between a transmitting device and one receiving device, in accordance with an embodiment of the invention.

FIG. 2 is a diagram that illustrates an exemplary usage scenario where distributed transceivers are centrally managed to create a high-performance link between a transmitting device and one receiving device, in accordance with an embodiment of the invention. Referring to FIG. 2, there is shown a master application device 210 and an end-user application device 220.

The master application device 210 may comprise suitable logic, circuitry, interfaces and/or code that may be operable to communicate multimedia information such as images, video, voice, as well as any other forms of data with one or more application devices such as the end-user application device 220. The master application device 210 may comprise a collection of distributed transceivers 212a through 212e, and a central processor 217 that comprises a central baseband processor 214, a network management engine 216 and a memory 218. In an exemplary embodiment of the invention, each of the collection of distributed transceivers 212a through 212e may be physically positioned and oriented at different locations within an application device such as a laptop, TV, gateway, and set-top box. In this regard, the collection of distributed transceivers 212a through 212e may be implemented in various ways such as, for example, a single distributed transceiver integrated in a single chip package; multiple silicon dies on one single chip; and multiple distributed transceivers on a single silicon die. Depending on device capabilities and user preferences, the distributed transceivers 212a-212e may be oriented in a fixed direction or multiple different directions. In another exemplary embodiment of the invention, the collection of distributed transceivers 212a-212e may be operable to receive and/or transmit radio frequency signals from and/or to the end-user application device 220 using air interface protocols specified in UMTS, GSM, LTE, WLAN, 60 GHz/mmWave, and/or WiMAX, for example.

The end-user application device 220 may comprise suitable logic, circuitry, interfaces and/or code that may be operable to enable communication with other devices, such as the master application device 210. In this regard, the end-user application device 220 may be substantially similar to the master application device 210. For example, the end-user application device 220 may comprise transceivers 222 and 224, utilizing antennas (or antenna arrays) 222a-222n and 224a-224m, respectively, a baseband processor 226, and a memory 228.

The central baseband processor 214 may comprise suitable logic, circuitry, interfaces and/or code that may be operable to perform baseband digital signal processing needed for transmission and receiving operation of the entire collection of distributed transceivers 212a through 212e. For example, the central baseband processor 214 may be operable to perform waveform generation, equalization, channel encoding/decoding, beamforming processing, multi-input multi-output (MIMO) processing, and/or packet processing associated with the operation of the collection of distributed transceivers 212a through 212e. In addition, the central baseband processor 214 may be operable to configure, manage and control orientations of the distributed transceivers 212a-212e. The baseband processor 226 may be substantially similar to the central baseband processor 214.

The network management engine 216 may comprise suitable logic, circuitry, interfaces and/or code that may be operable to monitor and collect communication environment information such as propagation environment conditions, link quality, application device capabilities, transmitter/receiver locations, target throughput, and/or application QoS requirements. The network management engine 216 may utilize the collected communication environment information to configure system, network and communication environment conditions as needed. For example, the network management engine 216 may be operable to perform high level system configurations such as the number of transceivers that are activated, the number of application devices that are being communicated with, adding/dropping application devices to the communication network 100. As shown in FIG. 2, the network management engine 216 is residing in the master application device 210. However, in some embodiments the network management engine 216 may reside on different network devices such as separate network microprocessors and servers on the communication network 100. The network management engine 216 may comprise a full software implementation, for example. In addition, the functionality of the network management engine 216 may be distributed over several devices in the communication network 100. In some embodiments the network management engine 216 may be operable to manage communication sessions over the communication network 100. In this regard, the network management engine 216 may be operable to coordinate operation of baseband processors in the communication network 100 such that various baseband processing may be split or shared among the baseband processors. For example, the network management engine 216 may enable multiple central baseband processors for parallel baseband processing in order to increase throughput if needed.

The memory 218 may comprise suitable logic, circuitry, interfaces and/or code that may be operable to store information such as executable instructions and data that may be utilized by the central baseband processor 214 and/or other associated component units such as, for example, the network management engine 216. The memory 218 may comprise RAM, ROM, low latency nonvolatile memory such as flash memory and/or other suitable electronic data storage. The memory 228 may be substantially similar to the memory 218.

In an exemplary operation, a wireless link may be established between the master application device 210 and the end-user application device 220 through a reflector 230. In an exemplary embodiment of the invention, the master application device 210 may be operable to continuously scan the propagation environment to identify the directions and antenna patterns that result in strong reflected signals at the end-user application device 220. Then, the master application device 210 may associate each strong reflector with one of the collection of distributed transceivers 212a through 212e so as to transmit an independent different or same data stream to the end-user application device 220 over each distributed transceiver and through each strong reflector. For a reflector identified by the NME, transceiver (or transceivers) that may result in strongest signal transmission at the direction of the reflector, may be selected and/or configured at the reflector's direction. For example, the master application device 210 transmits two data streams to the end-user application device 220 using two different distributed transceivers 212a and 212d that may use the same frequency channel. In particular, the distributed transceivers 212a may choose a beam pattern 250 and orientation for a direct LOS to a transceiver 222, for example, of the end-user application device 220 (the receiving device) and transmit a first data stream over a carrier frequency $RF_1$. On the other hand, the distributed transceivers 212d may choose a beam pattern 252 and orientation that is pointing towards the reflector 230 and transmit a second data stream also over the same carrier frequency $RF_1$. The reflector 230 then may reflect the beam 252 towards a different transceiver 224 of the end-user application device 220. The selection of the beam patterns 250 and 252 may come from the central baseband processor 214 and the network management engine 216. In an exemplary embodiment of the invention, the central baseband processor 214 may profile channel energy for directions of arrival and other schemes. The network management engine 216 may know communication environment information such as the number of users, number of streams needed, and/or available frequency channels. For example, the central baseband processor 214 and the network management engine 216 may select narrow beams for close devices and may select wide beams for further devices, respectively.

In one embodiment of the invention, the master application device 210 may be operable to utilize the reflector 230 for the second data stream, for example, to lower the chances of an object blocking both the first and second data streams, simultaneously. In other words, if a big enough object blocks the LOS between the master application device 210 and the end-user application device 220, the second data stream may likely be intact and sustained by complete direct reflecting through a reflected path 252a. Although FIG. 2 shows one reflector 230, in one embodiment of the invention, several reflectors may be used to transmit one data stream or multiple data streams. The use of multiple reflectors may provide reflection diversification in case one reflector or a sub-set of reflectors are blocked. In other words, instead of directing all transmit power towards one reflector only, the total transmit power may be distributed to propagate over a set of "good" reflectors in the environment. This distribution of power over different reflectors may be done in a controlled, configurable, adaptive, and intelligent manner. For example, reflectors may be chosen and targeted that provide better orthogonality (e.g., to minimize cross interference) between the different paths.

In FIG. 2, the master application device 210 may use a second reflector at a different location and another distributed transceiver 212c, for example, to communicate with the end-user application device 220 and send a third data stream. Also the reflected path 252a may be caused by more than one reflector where, for example, the distributed transceiver 212e transmits towards the reflector 230 and the reflection transmits towards a second reflector and the reflection of the second reflector reaches the end-user application device 220. In another embodiment of the invention, the first and second data streams in FIG. 2 may comprise the same data content and the use of LOS path and one or more reflector paths may provide link robustness for data content in case an obstacle blocks some of the paths.

The master application device 210 may continuously monitor and collect propagation environment conditions, link quality, device capabilities, locations, target throughput, cross-interference between the paths, and/or application QoS requirements reported from the end-user application device 220. In this regard, a feedback or negotiation channel 240 may be utilized to exchange and negotiate system configurations such as number of transceivers within devices, number of antennas per transceivers, the measured channel responses, the sequence of antenna array coefficients being evaluated, and/or device location. The feedback or negotiation channel 240 may be implemented through a WLAN (e.g., Wi-Fi 802.11*link), Bluetooth link (over 2.4 GHz band), and/or 60 GHz link, for example In some embodiments of the invention, the master application device 210 and/or the (slave) end-user application device 220 may deploy a plurality of baseband processors for implementing data processing requirements and/or demands. For example, multiple baseband processors may be deployed to generate and/or decode different data streams that may be transmitted or received by several distributed transceivers. In such configuration, the NME (e.g., NME 216) may be operable to control and/or coordinate operation of the multiple baseband processors. In this regard, several internal connection topologies may be used. In some embodiments of the invention, each baseband processor may be dedicated and/or assigned to a subset of distributed transceivers available in the system, and for each baseband processor, ring and/or star topologies (explained later) may be used in interacting with corresponding transceiver(s). In this regard, there may be no data transfer between the subsets. In another embodiment of the invention, however, all baseband processors and transceivers (within a device) may be connected together through a ring topology (single cable). In such scenario, the baseband processors may coordinate sharing the single cable, such as based on time-multiplexing (same IF frequency) or frequency-multiplexing (different IF frequencies). The baseband processors may have different power, processing, and/or communication characteristics. Accordingly, in some embodiments of the invention, the baseband processor that is most suitable for a particular mode of operation (e.g., lower power consumption meeting the throughput requirement) may be selected and activated, with the other baseband processors remaining inactive and/or getting disabled.

Figure 3:
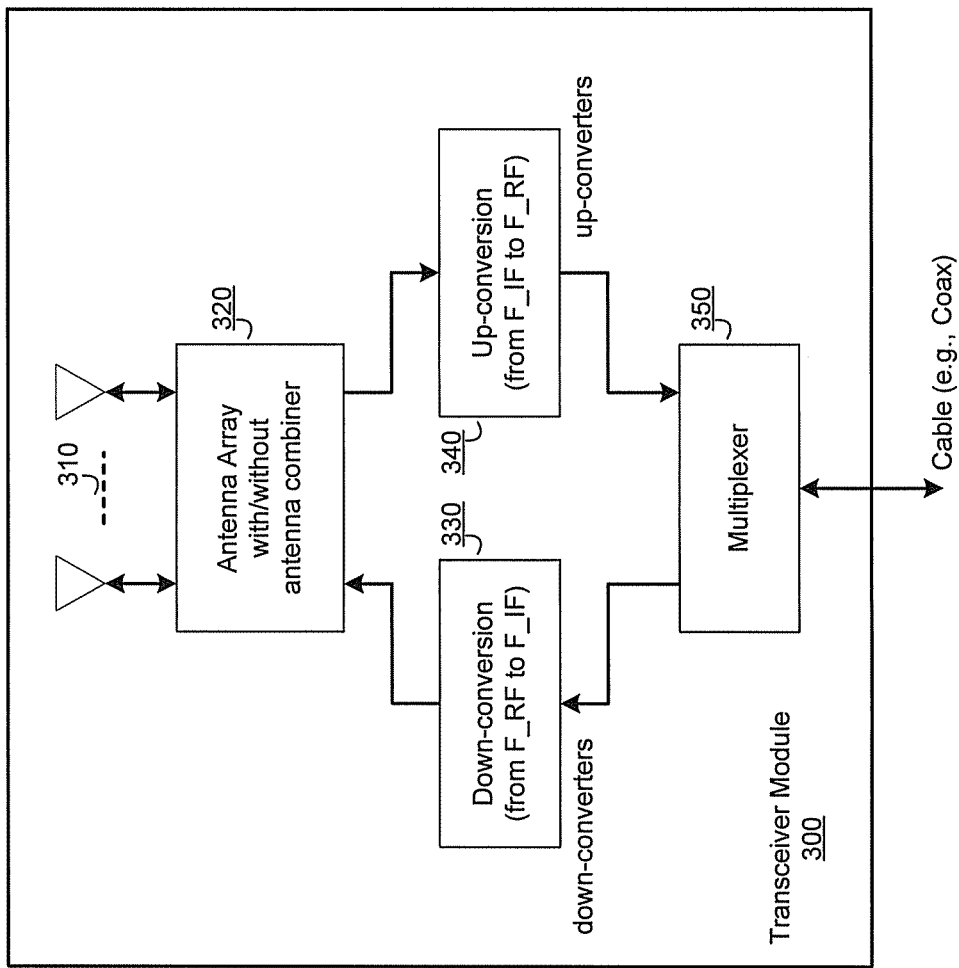
FIG. 3 is a diagram that illustrates an exemplary transceiver module, in accordance with an embodiment of the invention.

FIG. 3 is a diagram that illustrates an exemplary transceiver module, in accordance with an embodiment of the invention. Referring to FIG. 3, there is shown a transceiver 300 comprising an antenna array 310, an antenna array with/without antenna combiner 320, down-converters 330, up-converters 340, and a multiplexer 350.

In an exemplary operation, the antenna array 310 may comprise suitable logic, circuitry, interfaces and/or code that may be operable to transmit and receive radio frequency (RF) signals over the air. For transmission the transceiver 300 may be operable to receive a transmit signal from the central baseband processor 214. The transmit signal received from the central baseband processor 214 may be up-converted to RF frequency via the up-converters 340. For reception, the transceiver 300 may pass a receive signal from the antenna array 310 after down-conversion to the central baseband processor 214. The multiplexer 350 may comprise suitable logic, circuitry, interfaces and/or code that may be operable to multiplex the transmit signal received from the central baseband processor 214 and the receive signal supplied from the antenna array 310. In this regard, the multiplexer 350 may utilize either time-division-multiplexing or frequency-domain-multiplexing to communicate the transmit signal and the receive signal over the same medium such as a cable.

The antenna array with/without antenna combiner 320 may comprise suitable logic, circuitry, interfaces and/or code that may be operable to scale and/or phase-shift signals before the down-converters 330 and/or signals after the up-converters 340. For example, in transmission operation the signal provided by the up-converters 340 may be phase-shifted by the shifter by different values. The resulting phase-shifted signals may be fed to different antenna elements within the antenna array 310. In another embodiment of the invention, the antenna array 310 may be oriented in a fixed direction or multiple different directions depending on antenna types and user preferences. For example, the antenna array 310 may be implemented as a fixed directional antenna array to provide maximal directionality (with no explicit combiner). The same two modules, that is, the antenna array 310 and the antenna array with/without antenna combiner 320, may be correspondingly utilized in a reception operation for the transceiver 300. In an exemplary embodiment of the invention, the operation of the antenna array with/without antenna combiner 320 may be managed or programmed by the network management engine 216.

The down-converters 330 may comprise suitable logic, circuitry, interfaces and/or code that may be operable to translate a radio frequency (RF) received from the antenna array 310 to an intermediate-frequency (IF) signal during reception. The up-converters 340 may comprise suitable logic, circuitry, interfaces and/or code that may be operable to translate an intermediate-frequency (IF) signal of a corresponding baseband signal supplied from the central baseband processor 214, for example to a RF signal during transmission. In some embodiments, the IF frequency may be the same as the RF frequency (no frequency conversion), or the IF frequency may be equivalent to zero frequency (baseband frequency).

Figure 4:
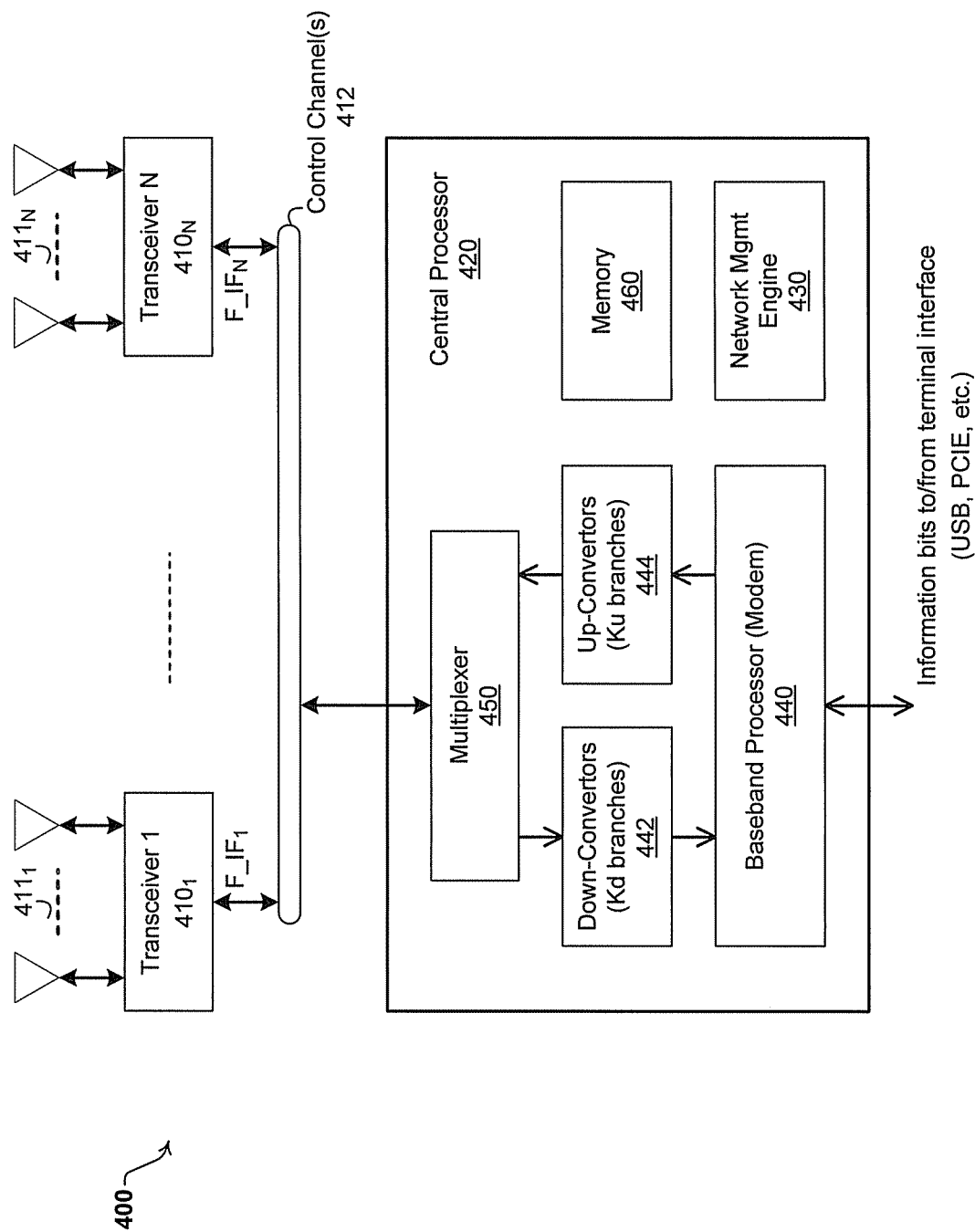
FIG. 4 is a diagram illustrating an exemplary application device with a collection of distributed transceivers, in accordance with an embodiment of the invention.

FIG. 4 is a diagram illustrating an exemplary application device with a collection of distributed transceivers, in accordance with an embodiment of the invention. Referring to FIG. 4, there is shown an application device 400, which may comprise a central processor 420 that is connected to a collection of distributed transceivers $410_1$-$410_N$.

The distributed transceivers $410_1$-$410_N$ and the central processor 420 may be connected using different topologies. For example, the distributed transceivers $410_1$-$410_N$ may be connected to the central processor 420 using a star topology, whereby direct separate cables may be used, for example, to connect the central processor 420 to each of the collection of transceivers $410_1$-$410_N$. Alternatively, a ring topology may be utilized, whereby a single movable cable or connector, for example, may be used to couple the central processor 420 to any particular one of the distributed transceivers $410_1$-$410_N$ at any given point. In other words, the central processor 420 may connect to one of the distributed transceivers $410_1$-$410_N$, and that connection may then be moved to a different transceiver when needed. One or more control channels between the central processor 420 and the distributed transceivers $410_1$-$410_N$ may be utilized for configuring and managing corresponding transceivers. The number and/or structure of the control channels may differ based on the connectivity topology. For example, with star topology, a plurality of control channels $412_1$-$412_N$ may be to connect the central processor 420 to each of the distributed transceivers $410_1$-$410_N$, and may be utilized for configuring and managing the transceivers $410_1$-$410_N$, respectively. In a ring topology, a single control channel 412 may be used, and may be utilized to the central processor 420 to each particular distributed transceiver $410_x$ at any given point, to enable configuring and managing that transceiver.

While the interface between the central processor 420 and the distributed transceivers $410_1$-$410_N$ may be described as utilizing cable (i.e., the central processor 420 being connected to the distributed transceivers $410_1$-$410_N$ via one or more cables), the invention may not be so limited. Accordingly, in some embodiments, the cable connection between the central baseband processor and the distributed transceivers may be substituted with an optical connection, printed-board connection, Ethernet cable, or another wireless connection.

The central processor 420 comprises a baseband processor 440, a network management engine 430, down-converters 442, up-converters 444, a multiplexer 450 and a memory 460. The baseband processor 440 may comprise suitable logic, circuitry, interfaces and/or code that may be operable to provide MODEM functionality. In this regard, the central processor 420 may be operable to perform various baseband digital processing such as MIMO, OFDM, channel coding, HARQ, channel estimation and equalization, Timing/Carrier recovery and synchronization. The network management engine 430 may operate in substantially the same manner as the network management engine 218 in FIG. 2. During transmission, a baseband signal supplied from the baseband processor 440 may be translated into an intermediate-frequency (IF) signal. The up-converters 444 may further translate the IF signal to a final radio-frequency (RF) and send it over the air through an antenna array such as the antenna array 411$_1$. For reception, the transceiver 410$_1$, for example, may pass a received RF signal from the antenna array 411$_1$ to the down-converters 442. The down-converters 442 may translate the RF signal into an IF signal. The IF signal may further be translated to a baseband signal to the baseband processor 440, for example. The multiplexer 450 may be responsible for multiplexing receive/transmit signals utilizing either time-division-multiplexing or frequency-domain-multiplexing. The memory 460 may comprise suitable logic, circuitry, interfaces and/or code that may be operable to store information such as executable instructions and data that may be utilized by the baseband processor 440 and/or other associated component units such as, for example, the network management engine 430. The memory 360 may comprise RAM, ROM, low latency nonvolatile memory such as flash memory and/or other suitable electronic data storage.

In some embodiments of the invention, the interface between the central processor 420 and the distributed transceivers 410$_1$-410$_N$ may also be configured to support the transceivers 410$_1$-410$_N$ having digital processing and mixed-signal capability—i.e., to allow for interactions based on non-analog IF connections. For example, the transceivers 410$_1$-410$_N$ may comprise analog-to-digital-converters (ADCs) and digital-to-analog-converters (DACs). In such scenario, a transceiver 410$_x$ may receive digital bits from the central processor 420 (through a digital link), after processing via the baseband processor 440 for example, and may use its internal DAC to generate the analog waveform and then perform the frequency up-conversion and beamforming steps. Similarly, a transceiver 410$_x$ may receive an RF waveform, down-convert it, and then use its internal ADC to digitize the waveform and send the digital bits over a digital connection/cable to the centralized processor 420 (where it may be further processed via the baseband processor 440 for example). In other embodiments of the invention, the transceivers 410$_1$-410$_N$ may comprise more digital processing blocks, in addition to ADC/DAC blocks. In such scenario, a portion of processing within the central processor 420 may be moved (e.g., in terms of partitioning) to the transceivers 410$_1$-410$_N$. In the above embodiments of the invention— i.e., when there may be need for digital based interfacing between the central processor and the transceivers—digital connections and/or interfaces such as Ethernet and various memory bus protocols may be deployed.

The distributed transceivers 410$_1$-410$_N$ may operate in various modes such as spatial diversity mode, frequency diversity mode, multiplexing mode, multiple-input-multiple-output (MIMO) mode, and/or relay mode. Furthermore, in some embodiments, the distributed transceivers 410$_1$-410$_N$ may be configured to switch between spatial diversity mode, frequency diversity mode, multiplexing mode, multiple-input-multiple-output (MIMO) mode, and/or relay mode based on corresponding propagation environment conditions, link quality, device capabilities, device locations, usage of resources, resource availability, target throughput, cross-interference between paths or transceiver pairs, and application QoS requirements.

In spatial diversity mode, the central processor 420 may be operable to utilize the distributed transceivers 410$_1$-410$_N$ to establish a spatial diversity link with intended end user device such as the end-user application device 220. For example, only a portion of the distributed transceivers 410$_1$-410$_N$ that may have strong propagation channel responses are activated and other transceivers are switched off for power saving. In another example, the distributed transceivers 410$_1$-410$_N$ may be arranged such that the master application device 210 (the transmitter) with available LOS towards the end-user device 220 (the receiver) may be configured to directly beam towards the receiver. In an exemplary embodiment of the invention, each active distributed transceiver may communicate data streams utilizing the same final carrier frequency. In frequency diversity mode, the central processor 420 may manage the distributed transceivers 410$_1$-410$_N$ similar to spatial diversity mode except that each active distributed transceiver may utilize a different final carrier frequency if such frequency spectrum channel is available. In some embodiments, the central processor 420 may also be operable to configure the distributed transceivers 410$_1$-410$_N$ in accordance with a polarization diversity mode. In this regard, the central processor 420 may be operable to configure the distributed transceivers 410$_1$-410$_N$ to establish a plurality of modules and/or links with intended end user devices having varying antenna polarization. For example, the central processor 420 may configure the antennas and/or antenna arrays (or subsets thereof) of each of the distributed transceivers 410$_1$-410$_N$ with different antenna polarizations to achieve antenna polarization diversification. In this regard, antenna polarization refers to the orientation of the electric field of the radio wave transmitted (or may be received) by an antenna. Accordingly, applying varying antenna polarization to each of the distributed transceivers 410$_1$-410$_N$ may enable receiving and/or transmitting signals by different distributed transceivers, each with a different polarization, and thus may reduce the interference therebetween—i.e., signals transmitted, by a particular antenna (or group of antennas) configured at antenna polarization P1, would not be received by a second antenna configured at different polarization P2, and as such would not interfere with signal reception at the second antenna.

In multiplexing mode, the central processor 420 may manage the distributed transceivers 410$_1$-410$_N$ in such a way that different streams of data may be transmitted through different sets of the distributed transceivers 410$_1$-410$_N$ (e.g., for improved effective throughput). For example, in multiplexing mode, different distributed transceivers of the distributed transceivers 410$_1$-410$_N$ may be dynamically programmed such that each transceiver's maximum pattern gain may be pointing to a different direction or reflector. As the environment changes (and hence location of reflectors and end user unit change), the antenna pattern of the distributed transceivers $410_1$-$410_N$ may be re-adjusted. In MIMO mode, the central processor 420 may manage the distributed transceivers $410_1$-$410_N$ in such a way that different streams of data may be transmitted through different sets of the distributed transceivers $410_1$-$410_N$ to a single receiver device such as the end-user application device 220.

In relay mode, the central processor 420 may manage the distributed transceivers $410_1$-$410_N$ to support relay mode of operation, whereby the application device 400 may be utilized in relaying data streams between two other devices. In this regard, the star topology implementation may particularly be suited for relay operations, enabling reception of input data stream from a first device, via a first set of the distributed transceivers $410_1$-$410_N$, and (re)transmission of the received data stream to a second device via a second set of the distributed transceivers $410_1$-$410_N$. The selection of the first and second sets of the distributed transceivers $410_1$-$410_N$, and the configuration thereof may be performed adaptively and/or dynamically. In this regard, the transceivers utilized in receiving and/or transmitting the relayed streams may be select such that to optimize the relaying operation performed. This may comprise, for example, selecting and/or configuring the transceivers such that radio frequencies and/or channels may be reused efficiently. For example, use of beamforming may enable mitigating potential interference between incoming and outgoing signals as to allow using the same radio frequency (RF) (e.g., for maximal reuse or utilization of frequency spectrum). In other words, the same RF channel/spectrum may be reused in manner that may allow for maintaining links with the two end devices utilizing physically separated transceivers that may use non-overlapping antenna patterns to minimize interference. Furthermore, the transceiver(s) maybe be configured as to use only some of the antennas available therein (e.g., subset of the antenna array), and/or may allow for use of transceivers without array processing. If cross interference between the incoming and outgoing waveforms is detected to be higher than a threshold, the NME may then configure the transceivers to use different final RF frequencies for incoming and outgoing waveforms.

In an embodiment of the invention, the application device 400 may utilize the various diversity modes available therein, such as to reduce interference among the distributed transceivers $410_1$-$410_N$ and/or antennas thereof, to enhance quality and/or communication performance, and/or to optimize resource utilization in the application device 400. For example, the distributed transceivers $410_1$-$410_N$ and/or antennas of the application device 400 may be configured based on, for example, spatial diversity, frequency diversity, and/or polarization diversity. For example, a particular diversity mode may be selected, and the distributed transceivers $410_1$-$410_N$ may be configured based the selected diversity mode, to enable enhancing communication in the application device 400 by reducing the interference between individual ones of the distributed transceivers $410_1$-$410_N$. In this regard, configuring a particular transceiver and/or antenna(s) associated therewith for spatial diversity mode may comprise specifying beamforming settings that ensure signals transmitted or received have particular, and typically narrow directionality. With frequency diversity mode, the configuration may comprise specifying particular frequency and/or channels used for transmitting or receiving signals, and with polarization diversity mode, the configuration may comprise specifying and/or applying particular antenna polarization settings.

In some instances, diversity modes of operations may comprise adaptive selection and/or configuration of groups of antennas, some of which may comprise only subset of antennas of a particular transceiver (e.g., grouping of only some of the antennas of the distributed transceiver $410_1$) while other groups may span antennas of more than one transceiver (e.g., grouping of all of the antennas of the distributed transceiver $410_1$ and some of the antennas of the distributed transceiver $410_N$). In this regard, rather than simply configuring individual transceivers, the diversity mode may comprise dynamic forming of communication blocks which may adaptively combine particular antennas (or antenna arrays) in the application device 400, along with one or more transceivers (e.g., transceivers connected to the selected antennas), with each of the communication blocks being configured separately and/or adaptively in accordance with the applicable diversity mode.

In some embodiments of the invention, the distributed transceivers $410_1$-$410_N$ of the application device 400 may be configured in accordance with multiple diversity modes. For example, the distributed transceivers $410_1$-$410_N$ may be configured such that each distributed transceiver $410_x$ and/or each antenna grouping may have spatial diversity, frequency diversity, and polarization diversity. In some instances, additional mechanisms may be incorporated into the diversity modes of operation to further enhance performance and/or efficiency in the devices and/or communication environment. For example, the application device 400 may apply channel coding during communication of data streams by configured transceivers, and/or may utilize frequency hopping to optimize frequency spectrum utilization. In this regard, channel coding may be used to protect communicated data (especially during wireless communication) against unwanted access, and/or to ensure that the communicated data may be received and/or extracted properly even in the presence of noise (errors) in the communication environment. Channel coding may comprise applying forward error correction and/or bit interleaving, such as using convolutional and/or block based coding schemes, to communicated data. Channel coding may also comprise use of space-time coding (STC), such as when multiple, redundant copies of a data stream are communicated via multiple configured communication blocks.

Configuring and/or utilizing diversity modes of operation may require coordinating at least certain aspects of the operations between the devices. For example, the application device 400 may establish low-throughput high-fidelity channels (e.g., over Bluetooth, WLAN, low data rate no-beamforming 60 GHz link, etc.), such as the feedback or negotiation channel 240, with target devices to communicate and negotiate system configuration related information, used for establishing and/or using high-throughput links. For example, the application device 400 may utilize such channels when selecting and/or negotiating parameters which may be utilized for configuring and/or applying diversity modes of operation. The application device 400 may use the feedback or negotiation channel 240 to communicate with the target device(s) to select and/or negotiate, for example, parameters relating to configuration of frequency and/or channel, directionality, antenna polarization, and/or timing.

Figure 5A:
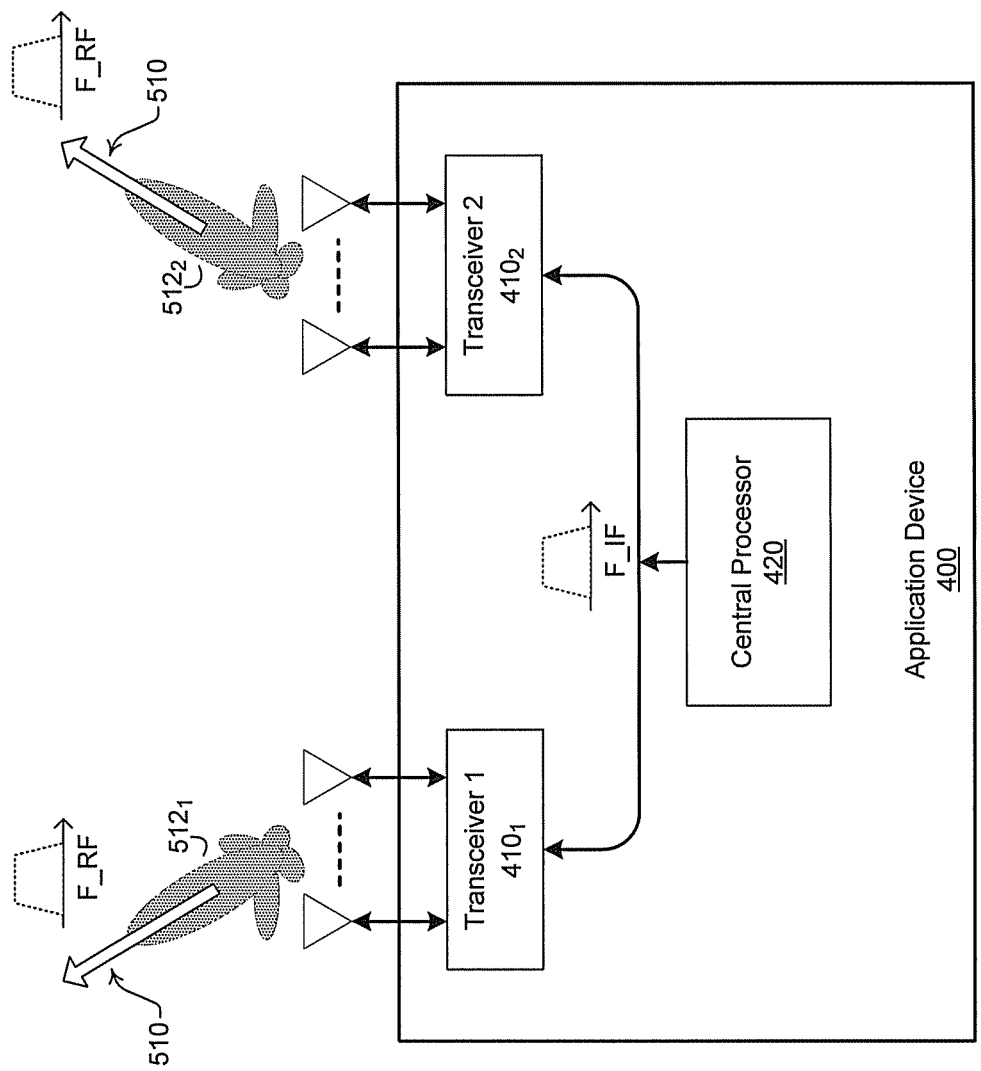
FIG. 5A is a diagram illustrating an exemplary application device that utilizes spatial diversity during communication via distributed transceivers, in accordance with an embodiment of the invention.

FIG. 5A is a diagram illustrating an exemplary application device that utilizes spatial diversity during communication via distributed transceivers, in accordance with an embodiment of the invention. Referring to FIG. 5A, there is shown the application device 400 of FIG. 4.

As shown in FIG. 5A, the application device 400 may be configured in accordance with spatial diversity mode of operation. In this regard, during spatial diversity mode of operation, when establishing and/or managing communication links between the application device 400 and other devices, the central processor 420 may configure the distributed transceivers 410₁-410_N such that transceivers and/or antennas (or groupings thereof) utilized for each communication link may exhibit spatial diversity relative to remaining transceivers and/or antennas. In this regard, the communication links may correspond to communication blocks, with each communication block corresponding to a particular communication link, and comprising one or more of the distributed transceivers 410₁-410_N and/or one or more antennas. In some instances, each of the communication blocks may be associated with a particular group of antennas. In this regard, antennas (or antenna arrays) of the distributed transceivers 410₁-410_N, may be grouped, with each group of antennas having a unique and spatially diverse beamforming setting and/or antenna arrangement, such that signals corresponding to a particular communication link may be transmitted and/or received in narrow and directional beams that are spatially positioned so that they do not overlap and/or intersect with signals of other communication links that are transmitted or received by other groups of antennas.

The antennas may be grouped dynamically and/or adaptively, whereby antenna groups may comprise only antennas (or antenna arrays) of individual transceivers (e.g., a grouping of only some or all of the antennas of the distributed transceiver 410₁), and/or may comprise antennas spanning multiple transceivers (e.g., a grouping of some or all of the antennas of the transceiver 410₁ and some or all of the antennas of the transceiver 410₂).

Use of spatial diversity may enable improving and/or enhancing the communication links and/or communication operations in the application devices. The improvements may be, for example, in the form of higher link throughput, longer range, and/or lower power consumption. For example, configuring the distributed transceivers 410₁-410_N in accordance with spatial diversity mode may reduce potential interference between the communication links, thus requiring less transmit power (i.e., reducing power consumption).

In an embodiment of the invention, spatial diversity may be utilized to enhance communication robustness and reliability. For example, multiple transceivers and/or groups of antennas may be configured to establish a plurality of spatially diverse communication links to the same receiving device, and these communication links may then be used to communicate the same data. These communication links comprise direct and/or indirect links. In this regard, during spatial diversity mode of operation, the same signal may be communicated to the transceivers, and the signal may then be communicated in different, non-overlapping directions. In other words, each transceiver (or group of antennas) may be configured with a distinct beamforming and/or antenna arrangement, and the copies of the same signals are transmitted such that if one signal path is blocked, the signal may still be received via path(s) that are not be blocked.

For example, for transmission of data stream 510, a first transceiver, such as the transceiver 410₁ which may have direct LOS towards the target receiving device, may be configured (based on its antennas arrangement and/or the beamforming settings specified via the central processor 420) to form and/or utilize a particular directional beam pattern 512₁, which may enable transmitting signals (or beams) directly towards the target receiving device. In addition, another transceiver, such as the transceiver 410₂, may be configured to form and/or utilize a particular directional beam pattern 512₂, which may enable transmitting signals (or beams) at a different direction, to transmit the same data stream 510 indirectly towards the target receiving device, such as through an available strong reflector. Using such redundant but spatially diverse communication links may provide the system with diversity against shadowing and/or blocking. For example, if a large obstacle blocks the LOS path, the indirect reflector path will likely be intact and sustained through the reflector. To further improve the performance, several reflectors may be chosen—in case one reflector or several reflectors are blocked, and multiple transceivers (or communication blocks) may be configured corresponding to the LOS path (if available) and to reflectors. In this regard, reflectors that provide better orthogonality between the different paths may be chosen and targeted. In some embodiments of the invention, the directional beams of a multiple transmission blocks (e.g., M transmission blocks) may be configured towards the top M reflecting points (in terms of strength of reflected signals) in the environment. In this regard, the application device 400 may identify and utilize reflectors present in the communication environment, comprising implanted reflectors or random existing reflectors.

On the receiving side, different schemes are used during redundant communication, depending on the capabilities of the receiving device for example, for supporting reception and/or handling of multiple beams carrying the same data stream (510). For example, if the receiving device is capable of configuring a sufficient number of communication blocks (e.g., it comprises a sufficient number of transceivers, with appropriate antenna arrangements), then each receiving module's beam pattern may be directed toward one of the plurality of reflecting points (e.g., one of the M reflecting points). Thus, multiple (M) reflected signals may be collected by the receiving device separately (hence resulting in minimal interference between different received reflections). Alternatively, if the receiving device cannot configure a sufficient number of communication blocks (e.g., it comprises only one transceiver), then the receiver beam pattern(s) may be configured to receive combined collection(s) of reflected received signals. In this case, although there may be interferences between the received reflections, the total received signal power over all reflections may still be maximized. The receiving device may then apply (via its own central processor, for example) equalization to mitigate the effects of inter-symbol-interference.

In an embodiment of the invention, only transceivers that may be determined to have strong propagation channel responses may be activated, with the other transceivers being switched off for power saving. For example, the application device 400 (e.g., via the central processor 420) may identify that transceiver 410₁ has the best LOS link to the target device (due to blocking objects in the room or nature of reflectors in the room). In this case only transceiver 410₁ may be switched on to transmit data stream 510, with the other transceivers (of which only transceiver 410₁ is shown) may be switched off for power saving. In some embodiments, within a transceiver module with multiple antennas, the central processor (420) may conclude that a subset of antennas within a transceiver is sufficient to deliver a target performance. In this case, the other antenna and corresponding blocks within the transceiver are switched off for further power saving.

In an embodiment of the invention, different transceivers, each with its own antenna array pattern, may be physically positioned and/or oriented at different locations within an application device such that the transceivers (and their antennas/antenna arrays) may be sufficiently separated to minimize the chances of having all transceivers blocked by an object between the two communicating units. Furthermore, each transceiver may be oriented such that its antenna array plane (and hence its maximum antenna array gain) may be pointing in a different direction compared to the other transceivers. This may provide maximum directional diversity, such that for any possible wireless link direction (e.g., to another device), there may be at least one transceiver covering that direction with a high antenna beam pattern gain. For example, in instances where the application device 400 comprises 4 transceivers (i.e., N being 4 in this case), a target spherical coverage may be partitioned into 4 relatively equal regions, and each of the transceivers $410_1$-$410_4$ may be physically installed within the application device 400, and/or oriented to cover a separate region with a high antenna beam pattern gain. In some embodiments, the relative and absolute orientation of transceivers $410_1$-$410_4$ is based on individual antenna patterns of transceivers $410_1$-$410_4$ if those transceivers are not identical. For instance, one transceiver may have a wide main antenna pattern lobe while others have narrower primary lobes. In such usage cases, the transceivers are physically mounted and fine-tuned to provide full coverage of space with minimal overlap of antenna patterns.

Figure 5B:
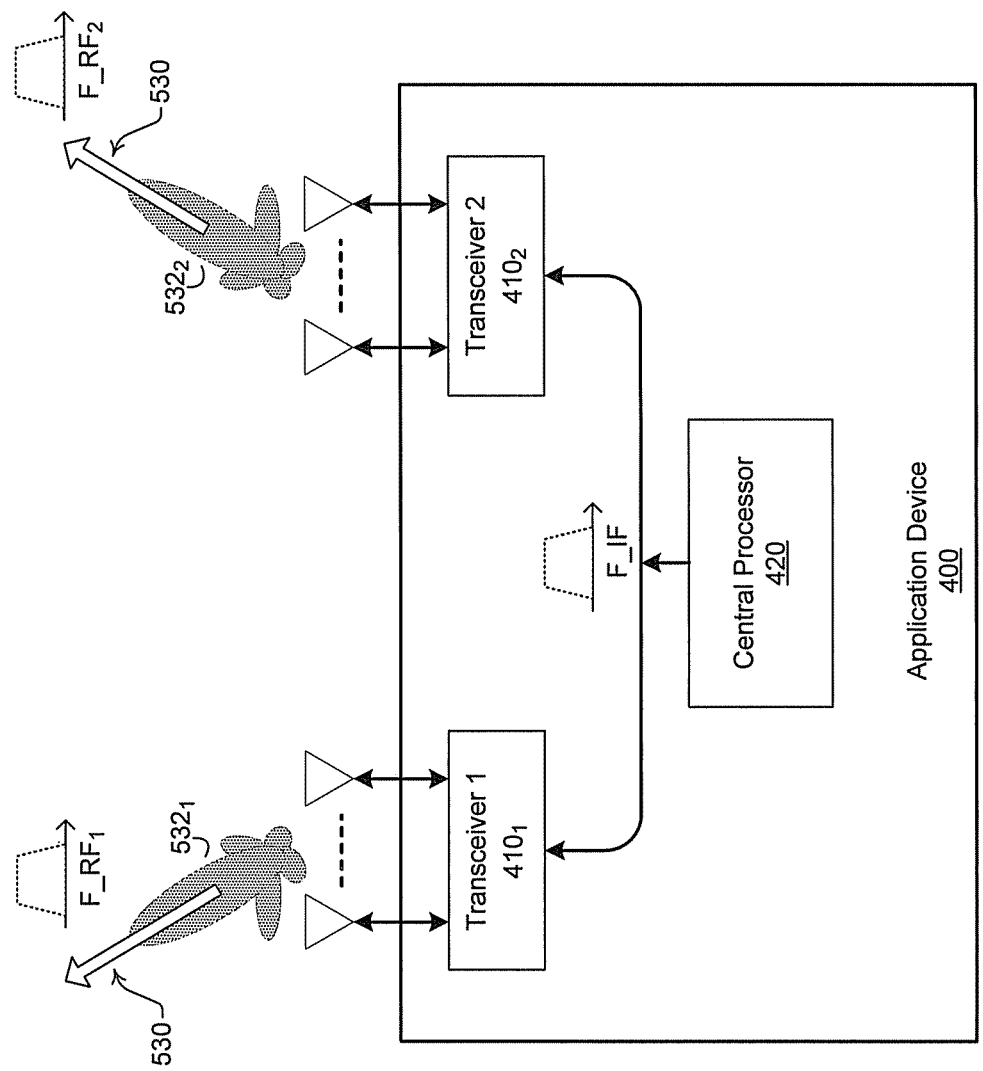
FIG. 5B is a diagram illustrating an exemplary application device that utilizes frequency diversity during communication via distributed transceivers, in accordance with an embodiment of the invention.

FIG. 5B is a diagram illustrating an exemplary application device that utilized frequency diversity during communication via distributed transceivers, in accordance with an embodiment of the invention. Referring to FIG. 5A, there is shown the application device 400 of FIG. 4.

As shown in FIG. 5B, the application device 400 may be configured in accordance with frequency diversity mode of operation. In this regard, during frequency diversity mode of operation, when establishing and/or managing communication links between the application device 400 and other devices, the central processor 420 may configure the distributed transceivers $410_1$-$410_N$ such that transceivers and/or antennas (or groupings thereof) utilized for each communication links may use different carrier radio frequency (RF) for the transmitted signals. In this regard, the communication links may correspond to communication blocks, with each module being configured to use a unique RF, which may be selected such that transmitted and/or received signals, for each communication link, may be separated at the receiving side from signals pertaining to the remaining links, which may be treated (based on having a different RF) as background noise.

In an embodiment of the invention, frequency diversity may be used to enhance communication robustness and reliability by communicating the same data to a particular receiving device, via multiple communication links each having a different RF. For example, the central processor 420 may configure the transceivers $410_1$ and $410_2$ to utilize two different RF carrier frequencies, $F\_RF_1$ and $F\_RF_2$, when transmitting and/or receiving signals. In this regard, when transmitting the data stream 530, the same intermediate frequency (IF) data corresponding to the data stream 530 may be up-converted via transceivers $410_1$ and $410_2$ into the two different RF carrier frequencies, $F\_RF_1$ and $F\_RF_2$, which may then be used in transmitting the data stream 530 to the same target receiving device. Thus, the transmitted signal streams exhibit frequency diversity, which may mitigate inter-symbol interference (ISI) between the signal streams transmitted by the two the transceivers $410_1$ and $410_2$. In some instances, the receiving device may be configured such that different communication blocks may be used to receive the signal streams. In other words, two of the communication blocks at the receiving device may be configured to tune in to carrier frequencies ($F\_RF_1$ and $F\_RF_2$) used at the transmitting side. Additionally, this feature may provide diversity against poor propagation channel response at one of the frequencies (e.g., becoming especially useful for narrowband communications). For example, if $F\_RF_1$ happens to experience a poor (e.g., deep fading) channel response, $F\_RF_2$ may be less likely to experience the same poor or deep fading propagation response.

In an embodiment of the invention, frequency diversity may be combined with other diversity modes. For example, to further enhance robustness of the links—e.g., to physical objects blocking the link—spatial diversity may also be incorporated into the configuration of transceivers being configured for frequency diversity mode of operation. In the previous example, this may be achieved by configuring the transceiver $410_1$ (e.g., based on selection and/or arrangement of antenna(s) and/or beamforming settings) such that, in addition to utilizing carrier frequency $F\_RF_1$, its antennas (or any subset thereof) may have a directional beam pattern $532_1$ which may be tuned for maximum gain in a particular direction D1. At the same time, the transceiver $410_2$, which utilizes carrier frequency $F\_RF_2$, may be configured (e.g., based on selection and/or arrangement of antenna(s) and/or beamforming settings) such that its antennas (or any subset thereof) may have a directional beam pattern $532_2$ which may be tuned for maximum gain at a different direction D2. The directions D1 and D2 may be chosen such that the transmitted signals may be directed to the same receiving device using different paths, to provide additional spatial diversity to the link, in addition to the frequency diversity. The different paths may correspond to two different reflection points or objects. Alternatively, one of the paths may correspond to direct LOS transmission. Incorporating varying directionality may ensure that at least one of the transmitted streams may be received, such as when the other stream (e.g., corresponding to direction D1) is blocked by an object.

Figure 6:
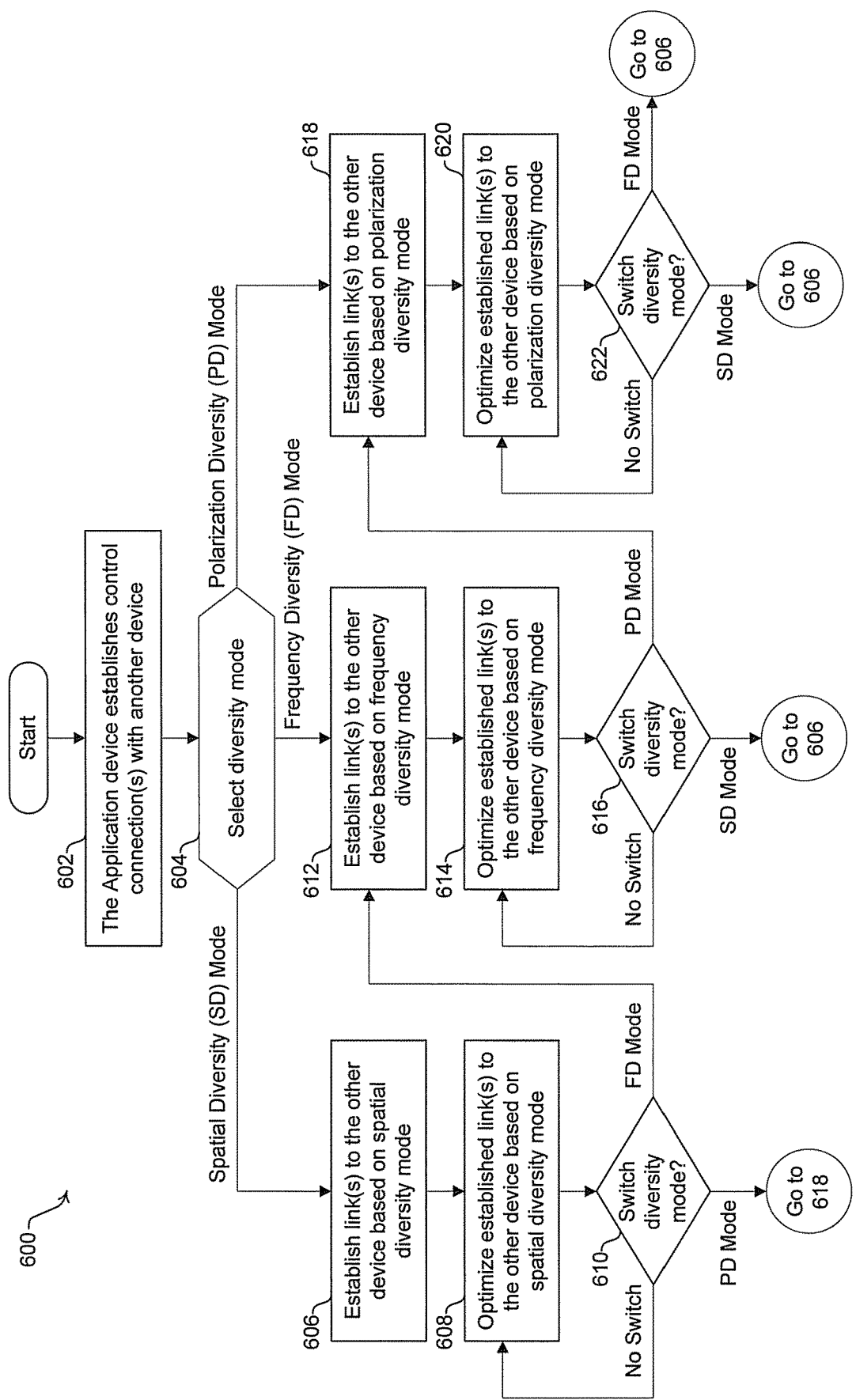
FIG. 6 is a flow chart that illustrates exemplary steps for configuring a device switch among a plurality of diversity modes of operations, and to switch in accordance with an embodiment of the invention.

FIG. 6 is a flow chart that illustrates exemplary steps for configuring a device switch among a plurality of diversity modes of operations, in accordance with an embodiment of the invention. Referring to FIG. 6, there is shown a flow chart 600 comprising a plurality of exemplary steps for performing applying and/or switching among a plurality of diversity modes in an application device, such as the application device 400.

In step 602, an application device, such as the application device 400, may establish control connection(s) with one or more target devices. For example, the application device 400 may establish the low-throughput high-fidelity channels with the target devices, which may be utilized to coordinate communications between the application device 400 and the target device(s). In this regard, the control connections may be utilized for communicating and negotiating system configurations used for high-throughput links. In step 604, a diversity mode of operation may be selected by the application device. In instances where the selected diversity mode of operation is a spatial diversity (SD) mode, the process may proceed to step 606.

In step 606, the application device may establish high-throughput, spatial diversity mode based link(s) to the target device(s). In this regard, each of the established links may exhibit unique (and to the extent possible orthogonal) spatial directionality. In step 608, the established link(s) to the other device may be optimized based on spatial diversity mode. In this regard, the links may be optimized based on continuous monitoring of link quality, device capabilities, and/or communication environment, cross-interference between the established spatial links, and/or based on detection of any changes thereof. Optimizing established links may comprise, for example reconfiguring communication components—e.g., reconfiguring the transceivers and/or antenna arrangements and/or adjusting beam forming settings. For example, the optimization procedure may comprise selecting the best transceiver(s) for each link. The application device may choose, for example, transceivers that may have better antenna pattern gains towards the target device(s) and/or transceivers that may provide maximally separated directions of transmissions (e.g., to minimize cross-interference between different transmissions). In other words, the optimization procedure may seek to achieve maximum reflection (or LOS) and directional diversity. In the spatial diversity mode, the application device may reuse the same RF carrier frequency for all active transceiver modules. The same RF carrier frequency usage may typically be considered by the NME, such as in scenarios where achieving a better spectral efficiency (e.g., through reuse of spectrum) may be a performance target. In some instances, however, multiple RF carrier frequencies may be utilized, thus incorporating elements of frequency diversity.

In step 610, it may be determined whether to switch diversity modes. Controlling switching among the modes may be based on the monitoring of link quality, device capabilities and/or communication environment, and/or detection of any changes therein. For example, the application device may determine, based on monitoring of channel conditions, dominant reflectors' positions, and/or the communication environment, whether it should switch to a frequency diversity mode and/or a polarization diversity mode. To determine whether to switch to the frequency diversity mode for example, the application device may regularly or dynamically monitor frequency channel conditions and availability. If no other frequency channels are available, the application device may continue to operate in the spatial diversity mode, and may continue to optimize the spatial diversity mode. If other frequency channels become available, however, the application device may have the option of switching to the frequency diversity mode. In determining whether to make the switch, the application device may examine or utilize other parameters such as the level of inter-symbol-interference (ISI), overlap between the antenna patterns of different active transceivers, as well as requests for higher quality-of-service (QoS) or throughput. For example, if other frequency channels are available and a better QoS is requested or ISI is too high, then unit A switches to the frequency diversity mode.

In instances where there is no switch in diversity modes, the process may return to step 608. In instances where it is determined that there need be a switch to frequency diversity (FD) mode, the process may jump to step 612. The switch to frequency diversity mode may require the application device to switch some of its transceivers to other RF carrier frequencies, which may have become available. This may help eliminate and/or reduce cross-interference between the waveforms transmitted by different transceivers. In instances where it is determined that there need be a switch to polarization diversity (PD) mode, the process may jump to step 618. The switch may require reconfiguring the transceivers and/or antennas, to modify the antenna polarization.

Returning to step 604, in instances where the selected diversity mode of operation is frequency diversity (FD) mode, the process may proceed to step 612. In step 612, the application device may establish high-throughput, frequency diversity mode based link(s) to the target device(s). In this regard, the application device may select one or more transceivers that may be suited for establishing frequency diversity mode links, where each of the established links may utilize a different RF carrier frequency. In the frequency diversity mode, the RF carrier frequencies of active transceivers may be selected and/or configured for maximal frequency diversity. For example, the RF carrier frequencies may be selected in order to mitigate interference (e.g., ISI) at the receiving side because of the different transmissions. Additionally, as in the spatial diversity mode, in some instances in the frequency diversity mode, the beam patterns and directionality of active transceivers may be selected and/or configured for optimal reflection and/or directionality. In step 614, the established link(s) may be optimized based on the frequency diversity mode. In this regard, the links may be optimized by dynamically or continually monitoring link quality, device capabilities, and/or communication environment, to detect any changes, and may reconfigure the communication components—e.g., reselect and/or reconfigure the transceivers and/or antennas, and/or modify frequency and/or channel selections.

In step 616, it may be determined whether to switch diversity modes, such as based on the parameters and/or conditions relating to link quality, device capabilities and/or communication environment, and/or based on any changes thereof. For example, while in the frequency diversity mode, the application device may regularly or dynamically monitor channel conditions and the communication environment, to determine whether it should switch to the spatial diversity mode and/or the polarization diversity mode. To determine whether to the switch to the spatial diversity mode, for example, the application device may determine, based on monitoring of channel conditions and/or the communication environment, whether it should switch to the spatial diversity mode (to conserve spectrum usage and be a good neighbor). For example, the application device may regularly monitor demand for frequency channels by other devices in the vicinity (since the application device is occupying multiple frequency channels in this mode). If other devices are requesting frequency spectrum, the application device may choose to switch to the spatial diversity mode where it may only use one frequency, thus freeing up remaining frequencies. Likewise, if the application device and the target device(s) can maintain their desired throughput and/or quality using less frequency channels (e.g. QoS is higher than required, ISI has gone down, changes in environment, channel, or throughput requirements, etc.) then the application device may switch back to spatial diversity mode. If, however, the application device determines that it should continue operating in the frequency diversity mode, and frequency channels are available, the application device may keep on optimizing frequency diversity mode parameters, and may also incorporate additional diversity optimization measures, such as optimizing the spatial directionality and/or antenna polarization of at least certain transceivers, even though they are operating at different RF carrier frequencies.

In instances where it is determined that no switch in diversity modes should occur, the process may return to step 614. In instances where it is determined that a switch to the spatial diversity (SD) mode should occur, the process may jump to step 608. In instances where it is determined that there need be a switch to the polarization diversity (PD) mode, the process may jump to step 618.

Returning to step 604, in instances where the selected diversity mode of operation is the polarization diversity (PD) mode, the process may proceed to step 618. In step 618, the application device may establish high-throughput, polarization diversity mode link(s) to the target device(s). In this regard, each of the established links may be associated with a particular antenna polarization. The antenna polarization settings may be selected in order to ensure that there would be less interference at the receiving side because of the different transmissions. In step 620, the established link(s) may be optimized based on the polarization diversity mode. In this regard, the links may be optimized based on dynamic or continuous monitoring of link quality, device capabilities, and/or communication environment, and/or based on detection of any changes therein. Optimizing established links may comprise, for example, reconfiguring communication components—e.g., reconfiguring the transceivers and/or antenna arrangements to adjust and/or modify antenna polarization settings applicable thereto. In step 622, it may be determined whether to switch diversity modes, such as based on the parameters and/or conditions relating to link quality, device capabilities and/or communication environment, and/or based on any changes therein. In instances where it is determined that no switch in diversity modes should occur, the process may return to step 620. In instances where it is determined that there should be a switch to the spatial diversity (SD) mode, the process may jump to step 608. In instances where it is determined that there should be a switch to the frequency diversity (FD) mode, the process may jump to step 612.

Various embodiments of the invention may comprise a method and system for providing diversity in a network that utilizes distributed transceivers with array processing. The application device 400 may be configured to operate in one or more diversity modes of operations, which may comprise a spatial diversity mode, a frequency diversity mode, and/or a polarization diversity mode. In this regard, configuring the application device 400 for a particular diversity mode of operation may comprise configuring, based on the diversity mode, a plurality of communication blocks from one or more of the plurality of distributed transceivers $410_1$-$410_N$, with each of the plurality of communication blocks comprising one or more antennas and/or antenna array elements, and at least one of that distributed transceivers $410_1$-$410_N$ that may be associated with the antenna(s) and/or antenna array element(s). The plurality of communication blocks may then be utilized to concurrently communicate data streams from and/or to the application device 400. In some instances, each of the concurrently communicated data streams may comprise the same data—i.e., for redundant communication of the same data stream. The application device 400 may switch among the plurality of diversity modes, including during communication operations, and one or more of the plurality of communication blocks may be reconfigured, dynamically, based on the switching.

The application device 400 may continuously monitor and/or collect, using the network management engine 430 for example, communication related information, such as propagation environment conditions, link quality, device capabilities, locations, target throughput, and/or application QoS requirements. The application device 400 may then select based on the monitoring, a diversity mode that the application device 400 may switch to and/or incorporate into its communication operations. In some instances, the application device 400 may configure, based on a location of one or more reflectors (e.g., reflector 230), beamforming settings and/or antenna arrangement for one or more of the plurality of communication blocks. Furthermore, the application device 400 may determine and/or select connection types and/or communication protocols that may be utilized for establishing one or more links via the plurality of communication blocks, for communicating the data streams. The application device 400 may allocate communication resources (e.g., up-convertors 442, down-convertors 444, and/or memory 460) to the plurality of communication blocks for use during the communication of the data streams. At least some of the allocated resources may be shared among the plurality of communication blocks.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for providing diversity in a network that utilizes distributed transceivers with array processing.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   in a device that comprises a plurality of distributed transceivers, a central processor and a network management engine:
   switching from a first operating diversity mode of a plurality of operating modes to a second operating mode of said plurality of operating modes based on a change in location of at least one user device with respect to at least one distributed transceiver of said plurality of distributed transceivers,
   wherein said plurality of operating modes comprises selection of a subset of antennas of said at least one distributed transceiver and coordination of at least a certain aspect of operations established between said at least one user device with said subset of antennas of said at least one distributed transceiver;

configuring a plurality of communication modules from one or more of said plurality of distributed transceivers, wherein:

said configuration is based on said second operating mode; and each of said plurality of communication modules comprises one or more antennas or antenna array elements, and one or more of said plurality of distributed transceivers associated with said one or more antennas or antenna array elements; and concurrently communicating data streams via said plurality of communication modules.

2. The method according to claim 1, further comprising switching among said plurality of operating modes during said communication.

3. The method according to claim 2, further comprising reconfiguring one or more of said plurality of communication modules based on said switching.

4. The method according to claim 2, wherein said plurality of operating modes comprise a spatial diversity mode, a frequency diversity mode, and a polarization diversity mode.

5. The method according to claim 1, wherein each of said concurrently communicated data streams comprises the same data.

6. The method according to claim 1, further comprising monitoring, by said network management engine, communication related information associated with at least one of said configuration of said plurality of communication modules or said communication of said data streams.

7. The method according to claim 6, further comprising selecting a diversity mode of said plurality of operating modes based on said monitoring.

8. The method according to claim 1, further comprising configuring, based on location of one or more reflectors, at least one of beamforming settings or antenna arrangement for one or more of said plurality of communication modules.

9. The method according to claim 1, further comprising determining at least one of connection types or communication protocols that are utilized for establishing one or more links via said plurality of communication modules, wherein the connection types or communication protocols are determined to perform said communication of said data streams.

10. The method according to claim 1, further comprising allocating communication resources to said plurality of communication modules for use during said communication of said data streams, wherein at least one of said allocated communication resources are shared among said plurality of communication modules.

11. The method according to claim 1, further comprising switching from said first operating mode of said plurality of operating modes to said second operating mode of said plurality of operating modes based on at least one of number of users, number of streams needed, or available frequency channels.

12. A system, comprising:
a device that comprises a plurality of distributed transceivers, a central processor and a network management engine, said device is operable to:
switch from a first operating mode of a plurality of operating modes to a second operating mode of said plurality of operating modes based on a change in location of at least one user device with respect to at least one distributed transceiver of said plurality of distributed transceivers, wherein said plurality of operating modes comprises selection of a subset of antennas of said at least one distributed transceiver and coordination of at least a certain aspect of operations established between said at least one user device with said subset of antennas of said at least one distributed transceiver;

configure a plurality of communication modules from one or more of said plurality of distributed transceivers, wherein:

said configuration is based on said second operating mode; and each of said plurality of communication modules comprises one or more antennas or antenna array elements, and one or more of said plurality of distributed transceivers associated with said one or more antennas or antenna array elements; and concurrently communicate data streams via said configured plurality of communication modules.

13. The system according to claim 12, wherein said device is further operable to switch among said plurality of operating modes during said communication.

14. The system according to claim 13, wherein said central processor is operable to reconfigure one or more of said plurality of communication modules based on said switching.

15. The system according to claim 13, wherein said plurality of operating modes comprise a spatial diversity mode, a frequency diversity mode, and a polarization diversity mode.

16. The system according to claim 12, wherein each of said concurrently communicated data streams comprises the same data.

17. The system according to claim 12, wherein said network management engine is operable to monitor communication related information associated with at least one of said configuration of said plurality of communication modules or said communication of said data streams.

18. The system according to claim 17, wherein said device is further operable to select a diversity mode of said plurality of operating modes based on said monitoring.

19. The system according to claim 12, wherein said central processor is operable to configure, based on location of one or more reflectors, at least one of beamforming settings or antenna arrangement for one or more of said plurality of communication modules.

20. The system according to claim 12, wherein said central processor is operable to determine at least one of connection types or communication protocols that are utilized for establishing one or more links via said plurality of communication modules, wherein the connection types or communication protocols are determined to perform said communication of said data streams.

21. The system according to claim 20, wherein said device is further operable to allocate communication resources to said plurality of communication modules for use during said communication of said data streams, wherein at least one of said allocated communication resources are shared among said plurality of communication modules.

* * * * *